United States Patent
Ibaragi et al.

(10) Patent No.: US 10,418,601 B2
(45) Date of Patent: Sep. 17, 2019

(54) STEEL FOIL FOR POWER STORAGE DEVICE CONTAINER, POWER STORAGE DEVICE CONTAINER, POWER STORAGE DEVICE, AND MANUFACTURING METHOD OF STEEL FOIL FOR POWER STORAGE DEVICE CONTAINER

(71) Applicants: NIPPON STEEL CORPORATION, Tokyo (JP); NIPPON STEEL CHEMICAL & MATERIAL CO., LTD., Tokyo (JP)

(72) Inventors: Masaharu Ibaragi, Kisarazu (JP); Koichi Nose, Chiba (JP); Kiyokazu Ishizuka, Himeji (JP); Yasuto Goto, Kimitsu (JP); Shuji Nagasaki, Sagamihara (JP); Hiroto Unno, Yokohama (JP)

(73) Assignees: NIPPON STEEL CORPORATION, Tokyo (JP); NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 205 days.

(21) Appl. No.: 15/327,227

(22) PCT Filed: Jul. 22, 2015

(86) PCT No.: PCT/JP2015/070818
§ 371 (c)(1),
(2) Date: Jan. 18, 2017

(87) PCT Pub. No.: WO2016/013572
PCT Pub. Date: Jan. 28, 2016

(65) Prior Publication Data
US 2017/0162836 A1    Jun. 8, 2017

(30) Foreign Application Priority Data
Jul. 22, 2014    (JP) .................................. 2014-149252

(51) Int. Cl.
*B32B 15/18*    (2006.01)
*H01M 2/02*    (2006.01)
(Continued)

(52) U.S. Cl.
CPC ............ *H01M 2/0287* (2013.01); *B32B 15/01* (2013.01); *C23C 10/28* (2013.01); *C23C 28/00* (2013.01);
(Continued)

(58) Field of Classification Search
None
See application file for complete search history.

(56) References Cited

U.S. PATENT DOCUMENTS 3,804,679 A * 4/1974 Streel ..................... C23C 10/28
148/525
2009/0029245 A1    1/2009 Ibaragi et al.
(Continued)

FOREIGN PATENT DOCUMENTS

| CN | 101331020 A | 12/2008 |
| CN | 103917684 A | 7/2014 |

(Continued)

OTHER PUBLICATIONS

International Search Report for PCT/JP2015/070818 dated Oct. 27, 2015.
(Continued)

*Primary Examiner* — Seth Dumbris
(74) *Attorney, Agent, or Firm* — Birch, Stewart, Kolasch & Birch, LLP

(57) ABSTRACT

A steel foil for a power storage device container includes a rolled steel foil which has a thickness of 200 μm or less, a diffusion alloy layer which is formed on a surface layer of the rolled steel foil and contains Ni and Fe, and a chromium-based surface treatment layer which is formed on the dif-
(Continued)

REVERSE POLE FIGURE fusion alloy layer. The <111> polar density in a reverse pole figure of the diffusion alloy layer in a rolling direction is 2.0 to 6.0, and the aspect ratio of crystal in a surface of the diffusion alloy layer is 1.0 to 5.0.

12 Claims, 8 Drawing Sheets

(51) Int. Cl.
| | |
|---|---|
| *B32B 15/01* | (2006.01) |
| *C23C 10/28* | (2006.01) |
| *C23C 28/00* | (2006.01) |
| *H01G 11/78* | (2013.01) |
| *C25D 3/12* | (2006.01) |
| *C25D 5/48* | (2006.01) |
| *C25D 5/50* | (2006.01) |
| *H01G 9/00* | (2006.01) |
| *H01G 9/08* | (2006.01) |
| *C25D 7/06* | (2006.01) |

(52) U.S. Cl.
CPC ............... *C25D 3/12* (2013.01); *C25D 5/48* (2013.01); *C25D 5/50* (2013.01); *C25D 7/0614* (2013.01); *H01G 9/0029* (2013.01); *H01G 9/08* (2013.01); *H01G 11/78* (2013.01); *H01M 2/026* (2013.01); *H01M 2/0262* (2013.01); *H01M 2/0285* (2013.01)

(56) References Cited

U.S. PATENT DOCUMENTS

| | | |
|---|---|---|
| 2012/0171518 A1 | 7/2012 | Takematsu et al. |
| 2014/0069555 A1 | 3/2014 | Inaguma et al. |
| 2014/0287259 A1* | 9/2014 | Ishizuka ............... C25D 7/0614 428/607 |
| 2016/0168657 A1* | 6/2016 | Horie ..................... C23C 10/28 148/518 |

FOREIGN PATENT DOCUMENTS

| | | | |
|---|---|---|---|
| JP | 4-41085 A | 2/1992 | |
| JP | 6-100983 A | 4/1994 | |
| JP | 10-212595 A | 8/1998 | |
| JP | H10212595 * | 8/1998 | ............... C25D 5/50 |
| JP | 2000-357494 A | 12/2000 | |
| JP | 2009-256734 A | 11/2009 | |
| WO | WO 2007/072604 A1 | 6/2007 | |
| WO | WO 2010/143374 A1 | 12/2010 | |
| WO | WO 2012/147922 A1 | 11/2012 | |
| WO | WO 2013/035210 A1 | 3/2013 | |

OTHER PUBLICATIONS

Written Opinion of the International Searching Authority PCT/JP2015/070818 (PCT/ISA/237) dated Oct. 27, 2015.
Chinese Office Action and Search Report, dated Oct. 12, 2018, for counterpart Chinese Application No. 201580039916.0, along with an English translation.

* cited by examiner

STEEL FOIL FOR POWER STORAGE DEVICE CONTAINER, POWER STORAGE DEVICE CONTAINER, POWER STORAGE DEVICE, AND MANUFACTURING METHOD OF STEEL FOIL FOR POWER STORAGE DEVICE CONTAINER

TECHNICAL FIELD OF THE INVENTION

The present invention relates to a steel foil for a power storage device container, a power storage device container, a power storage device, and a manufacturing method of the steel foil for a power storage device container. Priority is claimed on Japanese Patent Application No. 2014-149252, filed on Jul. 22, 2014, the content of which is incorporated herein by reference.

RELATED ART

A secondary battery such as a nickel-cadmium battery, a nickel-hydrogen battery, and a lithium-ion battery is widely used in an electronic device, an electronic component, particularly, a portable phone, a note-type personal computer, a video camera, a satellite, and an electric or hybrid vehicle. In the related art, in a secondary battery using a strong alkali electrolyte, such as a nickel-cadmium battery and a nickel-hydrogen battery, a case formed of a nickel-plated cold-rolled steel sheet or a plastic case is used as a case of the secondary battery. In a battery using a nonaqueous electrolyte, such as a lithium-ion battery, a nickel-plated steel sheet or stainless steel sheet is used for the case of the battery. Further, in the lithium-ion battery, a nonaqueous electrolyte incorporated in an aluminum pouch may be enclosed in a plastic case.

Recently, a reduction in the size and the weight of a secondary battery has been desired in association with a reduction in the size of an electronic or electric component. In accordance with such a trend, thinning of a secondary battery container is attractive as a method in which more electrolyte or active material can be incorporated in the limited volume so as to enable an increase of battery capacity. If the strength of the container by the thinning is degraded, there is a risk that the container is deformed or fractured when an external force is applied to the container or the container is pierced, and thus the electrolyte which is in the container may leak. The leakage of an electrolyte has a high probability of greatly damaging a device having a built-in secondary battery. In a case where a container is made of plastic or aluminum, generally, the strength is insufficient when the thickness is equal to or less than 200 µm. Thus, using a material which has high strength is needed for performing more thinning of a container. However, in terms of mass production, it is preferable that the material be cheap and versatile. That is, a material which has high strength, suitable corrosion resistance against an electrolyte (nonaqueous electrolyte), and high versatility is required in order to reduce the thickness of a secondary battery container. A container of a power storage device such as a capacitor including an electrolyte, which excludes the secondary battery, is also requested similarly.

For example, in Patent Document 1, a metallic foil in which an acid-modified polyolefin resin layer having properties as a barrier to a corrosion-causing substance is stacked on an aluminum foil subjected to chromium-based surface treatment such as trivalent chromium treatment or chromate treatment is proposed. According to this technology, it is possible to improve the workability or corrosion resistance to some extent. However, as described above, the strength of aluminum is insufficient.

Using a stainless steel foil is considered as a material having high strength. The stainless steel foil is a foil obtained by thinning stainless steel so as to have a thickness of 200 µm or less. Tensile strength and Vickers hardness of the stainless steel foil are generally 2 to 10 times those of plastic or aluminium. Thus, the stainless steel foil is a prospective thin material of the secondary battery container. However, a corrosion resistance of the stainless steel foil in an electrolyte is worse. Thus, if the stainless steel foil is used in a housing or a lead line of a battery, the stainless steel foil may be corroded by the electrolyte.

On the contrary, for example, in Patent Document 2, a metallic foil, in which a resin layer such as a polyolefin resin layer is stacked on a stainless steel foil and the like subjected to chromium-based surface treatment in order to improve corrosion resistance and strength, is proposed. In this steel foil, it is possible to achieve both certain strength and certain corrosion resistance. However, in a case using a stainless steel foil, the material is expensive, and work hardening is large. Thus, the cost of obtaining a foil by rolling is also increased. Further, since stainless steel is a relatively hard material, there is a problem in that working for obtaining a desired shape of a battery container may not be possible.

PRIOR ART DOCUMENT

Patent Document

[Patent Document 1] Japanese Unexamined Patent Application, First Publication No. 2000-357494
[Patent Document 2] PCT International Publication No. WO2007/072604

DISCLOSURE OF THE INVENTION

Problems to be Solved by the Invention

The present invention considers the above-described circumstances and was developed. An object of the present invention is to provide a steel foil for a power storage device container which is a rolled steel foil having high strength and excellent workability, and which has excellent adhesion between a substrate and a resin layer even in an electrolyte (nonaqueous electrolyte) in a case of being used in a power storage device container of which a polyolefin resin layer is formed on a surface, at a low price. Another object of the present invention is to provide a power storage device container including the steel foil for a power storage device container, and a power storage device including the power storage device container. In the present invention, adhesion between a substrate and a resin layer in an electrolyte is referred to as electrolyte resistance.

Means for Solving the Problem

The present invention is completed based on the above findings. The gist of the present invention is as follows.

(1) According to an aspect of the present invention, there is provided a steel foil for a power storage device container which includes a rolled steel foil which has a thickness of 200 µm or less, a diffusion alloy layer which is formed on a surface layer of the rolled steel foil and contains Ni and Fe, and a chromium-based surface treatment layer which is formed on the diffusion alloy layer. The <111> polar density in a reverse pole figure of the diffusion alloy layer in a rolling direction is 2.0 to 6.0, and an aspect ratio of a crystal in a surface of the diffusion alloy layer is 1.0 to 5.0.

(2) In the steel foil for a power storage device container of (1), $I_{FeNi3}/I_{Ni}$ which is a ratio between a intensity $I_{Ni}$ of a diffraction peak of Ni and a intensity $I_{FeNi3}$ of a diffraction peak of $FeNi_3$ which are obtained by measuring X-ray diffraction on the diffusion alloy layer may be equal to or higher than 5.0 or the diffraction peak of Ni may be not detected.

(3) The steel foil for a power storage device container of (1) or (2) may further include a polyolefin-based resin layer which is formed on the surface of the chromium-based surface treatment layer.

(4) According to another aspect of the present invention, there is provided a power storage device container which includes the steel foil for a power storage device container described in (3).

(5) According to still another aspect of the present invention, there is provided a power storage device which includes the power storage device container described in (4).

(6) According to still another aspect of the present invention, there is provided a manufacturing method of a steel foil for a power storage device container which includes a nickel-plating process of performing a nickel plating on a steel sheet so as to form a Ni-plated layer on the steel sheet, and obtaining a Ni-plated steel sheet, an annealing process of annealing the Ni-plated steel sheet so that Fe in the steel sheet and Ni in the Ni-plated layer are mutually diffused, a cold-rolling process of performing a cold rolling on the Ni-plated steel sheet at cumulative rolling reduction of 70% or higher, and obtaining a steel foil, a recrystallization annealing process of annealing the steel foil at 750° C. to 1100° C. for 4 to 120 seconds under an annealing condition in which Tc and Ta satisfy the following expression (i) in a case of 750≤Ta≤800 and satisfy the following expression (ii) in a case of Ta>800 when an annealing time is defined as Tc in a unit second, and an annealing temperature is defined as Ta in a unit of ° C., and a chromium-based surface treatment process of performing a chromium-based surface treatment on the steel foil.

$$Tc \geq 13 - 0.1 \times (Ta - 750) \quad \text{(i)}$$

$$Tc \geq 8 - (4/300) \times (Ta - 800) \quad \text{(ii)}$$

(7) In the manufacturing method of a steel foil for a power storage device container described in (6), in the recrystallization annealing process, the Tc and the Ta may satisfy the following expression (iii) in a case of 750≤Ta≤800, and satisfy the following expression (iv) in a case of Ta>800, $$Tc \geq 16 - 0.1 \times (Ta - 750) \quad \text{(iii)}$$

$$Tc \geq 11 - 0.02 \times (Ta - 800) \quad \text{(iv)}$$

(8) The manufacturing method of a steel foil for a power storage device container described in (6) or (7) may further include a polyolefin resin layer forming process of forming a polyolefin resin layer on a surface of the steel foil after the chromium-based surface treatment process.

Effects of the Invention

According to the above aspects of the present invention, it is possible to provide a steel foil for a power storage device container which is a rolled steel foil having high strength and excellent workability, and which has excellent adhesion between a substrate and a resin layer even in an electrolyte in a case of being used in a power storage device container of which a polyolefin resin layer is formed on a surface, at a low price. In addition, it is possible to provide a power storage device container including the steel foil for a power storage device container, and a power storage device including the power storage device container.

EMBODIMENTS OF THE INVENTION

A container in which a polyolefin resin layer is formed on a metal substrate on which a chromium-based surface treatment layer is formed is generally used for a power storage device container manufactured by using a steel foil for a power storage device container. In the embodiment, a surface-treated layer formed by chromium-based surface treatment such as trivalent chromium treatment or chromate treatment is referred to as a chromium-based surface treatment layer.

The inventors have diligently conducted an investigation on the cause of exfoliating a resin layer in an electrolyte in such a power storage device container.

Such a power storage device container is always exposed by a nonaqueous electrolyte included in a power storage device. The nonaqueous electrolyte includes an organic solvent and a lithium salt. Thus, if the nonaqueous electrolyte is used for a long period of time, a corrosion-causing substance such as acid may be generated by decomposing the organic solvent or the lithium salt. For example, in a case where lithium hexafluorophosphate is used as the lithium salt, fluorinated acid may be generated as the corrosion-causing substance.

The inventors have found that a corrosion-causing substance attacks a metal substrate, a chromium-based surface treatment layer, or a polyolefin resin layer, and thus the polyolefin resin layer may be exfoliated if the corrosion-causing substance is generated in an organic solvent. It is considered that exfoliation of the polyolefin resin layer occurs by corrosion of the metal substrate or degradation of the polyolefin resin layer. Thus, it is considered that improving corrosion resistance of the metal substrate is effective for preventing exfoliation of the polyolefin resin layer.

In a case where a steel foil for a power storage device container is formed and processed so as to manufacture a power storage device container, deformation processing such as press forming or deep-drawing forming is performed on the steel foil for a power storage device container. Thus, the steel foil for a power storage device container is required obtains excellent workability in addition to corrosion resistance.

Figure 7:
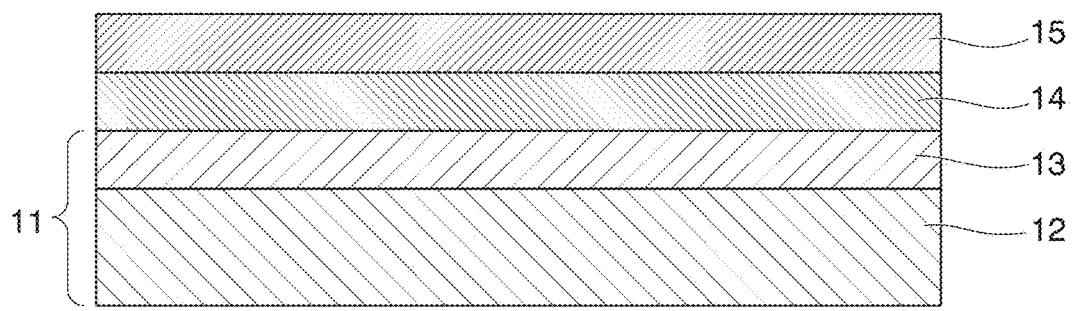
FIG. 7 is a schematic diagram showing a cross section of the steel foil for a power storage device container according to the embodiment.

A steel foil for a power storage device container according to an embodiment (may be referred to as a steel foil according to the embodiment, below) includes a rolled steel foil of which a diffusion alloy layer is formed on a surface layer and which serves as a substrate, and a chromium-based surface treatment layer formed on a surface of the diffusion alloy layer. Further, a polyolefin resin layer may be formed on the chromium-based surface treatment layer, as shown in FIG. 7, in the steel foil for a power storage device container according to the embodiment. In the steel foil for a power storage device container according to the embodiment, the diffusion alloy layer formed on the surface layer of the rolled steel foil contains Ni and Fe. The diffusion alloy layer has specific texture. The aspect ratio of crystals on the surface of the diffusion alloy layer is 1.0 to 5.0. Thus, the steel foil for a power storage device container according to the embodiment has excellent corrosion resistance against a nonaqueous electrolyte, and excellent workability. Such a steel foil for a power storage device container is manufactured for an example, by the following manner. stretched Annealing is performed on a steel sheet having nickel plating, so as to mutually diffuse Ni in the plating and Fe in the steel sheet, and then cold rolling is performed under a condition of the total reduction of equal to or more than 70% so that a thickness is 200 μm and specific texture is formed on the surface layer subjected to nickel plating. Then, recrystallization annealing is performed so as to reduce the size of grains stretched by cold rolling. Hereinafter, the steel foil for a power storage device container according to the embodiment will be described in detail.

<Substrate>

Regarding the steel foil according to the embodiment, a rolled steel foil in which a diffusion alloy layer containing Ni and Fe is formed a surface layer, and the thickness is equal to or less than 200 μm, is defined as a substrate.

The reason using the rolled steel foil having a thickness of 200 μm or less as the substrate is because, as will be described later, rolling is more useful for controlling texture of the diffusion alloy layer, in addition to being more advantageous than an electrolyte foil, from the point of cost and strength.

<Rolled Steel Foil>

A rolled steel foil used in manufacturing the steel foil according to the embodiment is obtained by rolling a steel sheet. The steel sheet is not particularly limited, and may use any of a hot-rolled steel sheet, a cold-rolled steel sheet, and a cold-rolled annealed steel sheet. However, typically, it is difficult to manufacture a foil of 200 μm or less using the hot-rolled steel sheet by cold rolling which will be described later, from a viewpoint of rolling capacity. Even if a foil of 200 μm or less can be manufactured using the hot-rolled steel sheet, it is ineffective and uneconomical. Thus, it is preferable to use a cold-rolled steel sheet or a cold-rolled annealed steel sheet as the substrate of the steel foil according to the embodiment.

An element composition (chemical composition) of a steel sheet used as the substrate of the steel foil for a power storage device container according to the embodiment is not particularly limited. Containing an amount of a specific element in the steel sheet in order to improve strength or improve corrosion resistance is not necessarily a requirement. Meanwhile, steel having high strength may be applied. However, from a point of ensuring rolling properties which will be described later, a steel sheet having a general element composition is preferably used. An example of the element composition is as follows. In the following descriptions, % relating to the element composition is mass %.

C: 0.0001 to 0.1%,
Si: 0.001 to 0.5%,
Mn: 0.01 to 1.0%,
P: 0.001 to 0.05%,
S: 0.0001 to 0.02%,
Al: 0.0005 to 0.20%,
N: 0.0001 to 0.0040%, and
Remainder: Fe and impurities The reason that the amount of each element is preferably in the above-described range will be described.

(C: 0.0001 to 0.1%)

C is an element for improving strength of steel. If the C content is too high, the strength is too high, and thus rolling properties are degraded. As will be described later, the strength of the steel foil according to the embodiment is increased by work hardening at high cumulative rolling reduction. Thus, in consideration of easy rolling, a steel sheet used as a material is preferably soft. Thus, the upper limit of the C content is preferably set to 0.1%. The lower limit of the C content is not required to be particularly specified. However, in consideration of refining cost, the lower limit of the C content is preferably set to be 0.0001%. The C content is more preferably 0.001 to 0.01%.

(Si: 0.001 to 0.5%)

Si is an element for improving strength of steel. If the Si content is too high, the strength of the steel is too high, and thus rolling properties of steel are degraded. Thus, the upper limit of the Si content is preferably set to 0.5%. The lower limit of the Si content is not required to be particularly specified. However, in consideration of refining cost, the lower limit of the Si content is preferably set to be 0.001%. The Si content is more preferably 0.001 to 0.02% in order to ensure higher rolling properties.

(Mn: 0.01 to 1.0%)

Mn is an element for improving strength of steel. If the Mn content is too high, the strength of the steel is too high, and thus rolling properties are degraded. Thus, the upper limit of the Mn content is preferably set to 1.0%. The lower limit of the Mn content is not required to be particularly specified. However, in consideration of refining cost, the lower limit of the Mn content is preferably set to be 0.01%. The Mn content is more preferably set to be 0.01 to 0.5% in order to ensure higher rolling properties.

(P: 0.001 to 0.05%)

P is an element for improving strength of steel. If the P content is too high, the strength of the steel is too high, and thus rolling properties are degraded. Thus, the upper limit of the P content is preferably set to 0.05%. The lower limit of the P content is not required to be particularly specified. However, in consideration of refining cost, the lower limit of the P content is preferably set to be 0.001%. The P content is more preferably set to be 0.001 to 0.02% in order to ensure higher rolling properties.

(S: 0.0001 to 0.02%)

S is an element which degrades hot workability and corrosion resistance of steel. Thus, the S content is preferable as small as possible. In particular, if the S content is more than 0.02%, hot workability and corrosion resistance is significantly degraded. Thus, the upper limit of the S content is preferably set to 0.02%. The lower limit of the S content is not required to be particularly specified. However, in consideration of refining cost, the lower limit of the S content is preferably set to be 0.0001%. The S content is more preferably set to be 0.001 to 0.01% in order to ensure higher rolling properties and to obtain predominance in consideration of cost.

(Al: 0.0005 to 0.20%)

Al is added as a deoxidizing element of steel. The Al content is preferably set to be equal to or more than 0.0005% in order to obtain effects occurring by deoxidation. However, if the Al content is too high, rolling properties of steel are degraded. Thus, the upper limit of the Al content is preferably set to 0.20%. The Al content is more preferably set to be 0.001 to 0.10% in order to ensure higher rolling properties.

(N: 0.0001 to 0.0040%)

N is an element which degrades hot workability and workability of steel. Thus, the N content is preferable as small as possible. In particular, if the N content is more than 0.0040%, hot workability and workability is significantly degraded. Thus, the upper limit of the N content is preferably set to 0.0040%. The lower limit of the N content is not required to be particularly specified. However, in consideration of refining cost, the lower limit of the N content is preferably set to be 0.0001%. The N content is more preferably set to be 0.001 to 0.0040% in order to obtain predominance in a point of cost.

(Remainder: Fe and Impurities)

The remainder of the steel sheet is Fe and impurities.

Steel for manufacturing the steel foil according to the embodiment may further contain Ti, Nb, B, Cu, Ni, Sn, Cr, and the like as additional elements. The additional elements may be contained as long as effects of the embodiment are not degraded, instead of some of Fe. In particular, Ti and Nb have an effect of fixing C and N in steel as a carbide and a nitride, and improving the workability of steel. Thus, one type or two of Ti and Nb may be contained in a range of Ti: 0.01 to 0.8% and Nb: 0.005 to 0.05%.

<Diffusion Alloy Layer>

The steel foil for a power storage device container according to the embodiment includes the diffusion alloy layer on the surface layer of the rolled steel foil. The diffusion alloy layer has texture in which the <111> orientation is parallel to a rolling direction and contains Ni and Fe. Here, the <111> orientation being parallel to the rolling direction means that the <111> orientation of Ni (nickel) or $FeNi_3$ having fcc (face-centered cubic lattice) structure is parallel to the rolling direction.

Specifically, as the texture, polar density of the <111> orientation in the rolling direction (RD) is equal to or more than 2.0. When the polar density of the <111> orientation in the rolling direction (RD) is equal to or more than 2.0, good characteristics are obtained. The polar density of the <111> orientation in the present invention is defined as the maximum value of polar density in a range of being within 5° from <111>. The upper limit of the polar density of the <111> orientation in the rolling direction is not particularly limited. However, generally, the polar density of the <111> orientation is not more than about 6.0. Thus, the substantial upper limit of the polar density of the <111> orientation in the rolling direction is 6.0.

By setting the texture of the diffusion alloy layer containing Ni and Fe to be in the above-described range, it is possible to improve corrosion resistance with the small amount of nickel. In other words, it becomes possible to minimize the amount of nickel required for satisfying corrosion resistance against the corrosion-causing substance included in an electrolyte. Thus, it is useful from a viewpoint of cost. That is, both the cost and performance have a level which is excellent in Industrial capability.

The reason of obtaining such an effect with the small amount of nickel is not necessarily clear. However, it is estimated that improving uniformity and coatability of nickel in the diffusion alloy layer has an influence on the above effect. Specifically, $FeNi_3$ in which Ni or some of Ni atoms are substituted with Fe has the fcc structure, and a close-packed plane is the {111} plane. Thus, it is estimated that by setting the <111> orientation in the diffusion alloy layer to be parallel to the rolling direction, a dense diffusion alloy layer is formed.

In the fcc structure, the {111} plane is referred to as a slip plane. The {111} plane can be preferentially oriented by deformation processing in which cold rolling or the like is performed. Thus, it is possible to control the above-described texture by using a rolling process.

The electron back scatter diffraction (EBSD) method is used for specifying the texture of the diffusion alloy layer according to the embodiment. Specifically, an EBSD pattern is obtained from a surface of a sample which is largely inclined (70°), in a scanning electron microscope (SEM). Crystal orientations at an originating point of a diffraction pattern are continuously measured by using the obtained EBSD pattern.

A feature of the EBSD pattern is that depth of obtained information is significantly shallow. Although the depth depends on conditions, the depth is just several tens nm. Thus, by performing EBSD measurement from a plate surface direction, it is possible to specify the crystal orientation of Ni, Fe, FeNi alloys, and the like in the surface of the diffusion alloy layer. Further, a reverse pole figure can be obtained from the EBSD pattern, and thus, the polar density can be obtained.

Figure 1A:
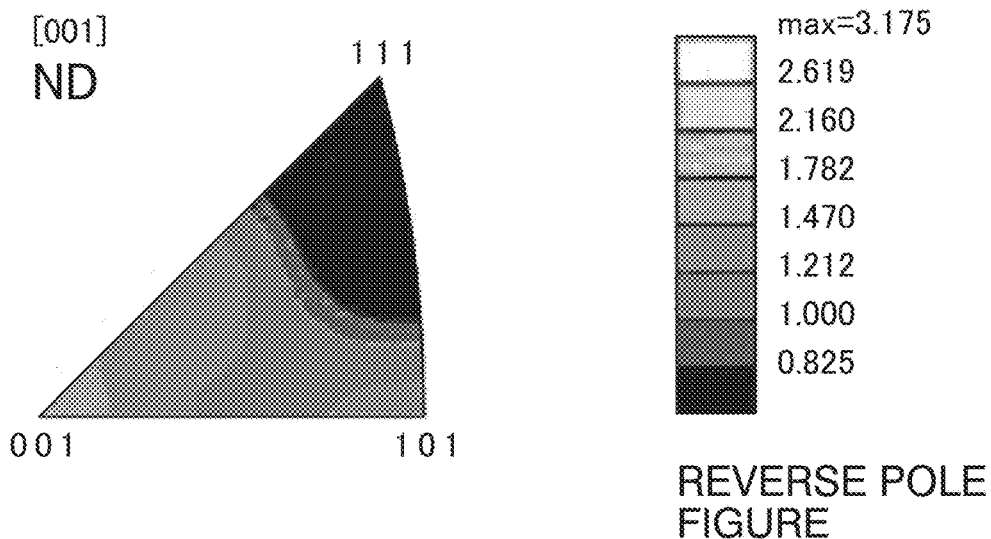
FIG. 1A is a diagram showing an example of texture (reverse pole figure) of a diffusion alloy layer in a steel foil for a power storage device container according to an embodiment, which is measured by an EBSD method, and is a reverse pole figure of a sheet surface in a normal direction (ND).
Figure 1B:
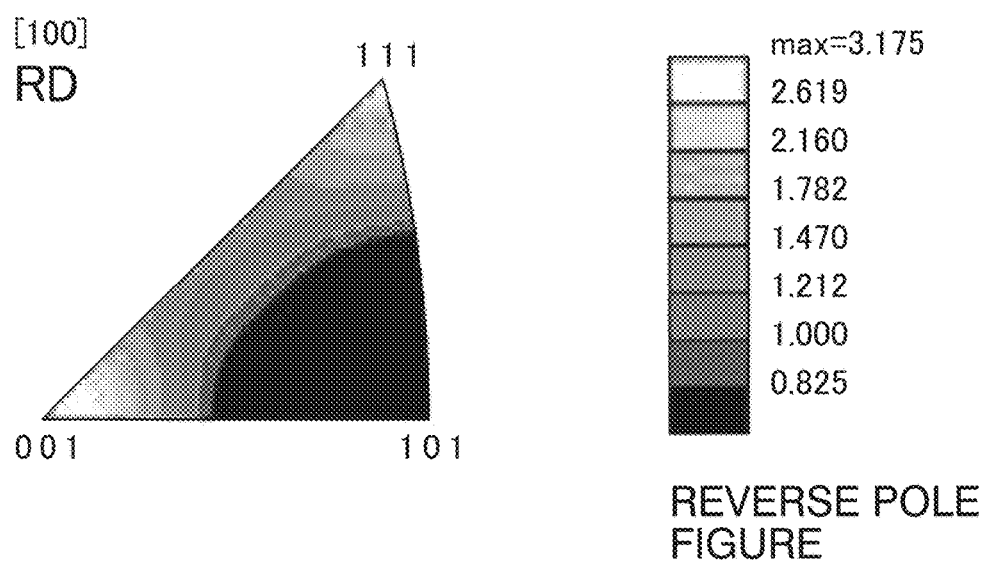
FIG. 1B is a diagram showing an example of the texture (reverse pole figure) of the diffusion alloy layer in the steel foil for a power storage device container according to the embodiment, which is measured by the EBSD method, and is a reverse pole figure in a rolling direction (RD).
Figure 1C:
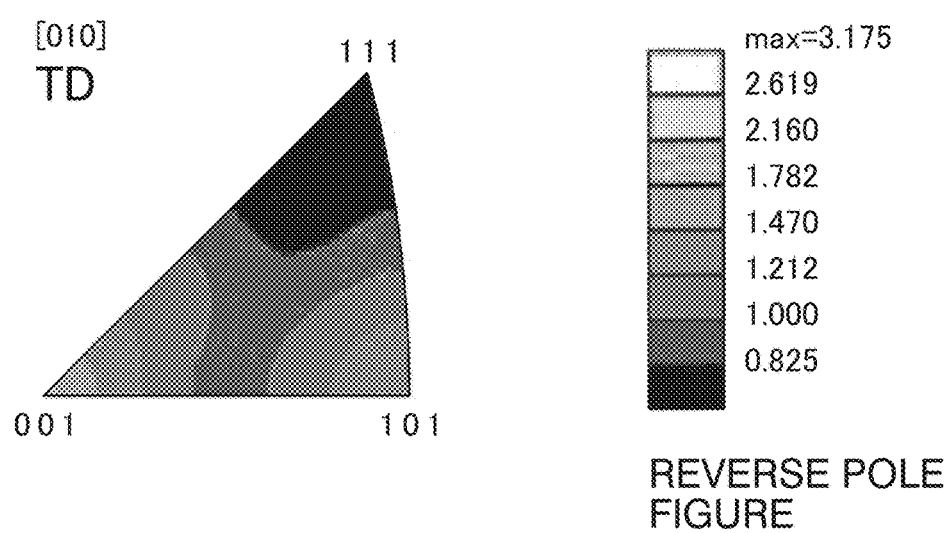
FIG. 1C is a diagram showing an example of the texture (reverse pole figure) of the diffusion alloy layer in the steel foil for a power storage device container according to the embodiment, which is measured by the EBSD method, and is a reverse pole figure in a direction perpendicular to the rolling direction (TD).

FIGS. 1A to 1C show an example of the texture (reverse pole figure), which is obtained by the EBSD method, of the diffusion alloy layer in the steel foil according to the embodiment. FIGS. 1A to 1C are diagrams, respectively, in which the degree of the texture is denoted by contour lines of polar density in ND (normal direction of the plate surface), RD (rolling direction), and TD (direction perpendicular to the rolling direction) on the assumption that polar density in a state where the crystal orientations are not totally deviated (so-called a random state) is set as 1.

According to FIGS. 1A to 1C, it is understood that the diffusion alloy layer included in the steel foil according to the embodiment has texture, and the integration degrees of the <111> and <001> orientations in RD are high. When referring a scale of the contour lines which are shown in FIGS. 1A to 1C, polar density of the <111> orientation in RD has a scale of 2.619 to 3.175, and polar density of the <001> orientation in RD has a scale of 2.619 to 3.175. The <001> orientation is orientated in ND and TD as shown in FIGS. 1A to 1C and is not orientated only in RD. Thus, it is understood that the diffusion alloy layer in the steel foil according to the embodiment is characterized by integration of the <111> orientation in RD. Although integration of the <001> orientation is viewed in ND and TD, in the scale of contour lines, the polar density of each of ND and TD does not reach 2. Thus, it is difficult to determine that distinguishing texture is formed in ND and TD.

The aspect ratio of crystal in the surface of the diffusion alloy layer is required to be in a range of 1.0 to 5.0, in order to improve workability. The aspect ratio is an index for the residual strain amount in the diffusion alloy layer and the rolled steel foil. When the aspect ratio is in the range of 1.0 to 5.0, strain of the rolled steel foil and the diffusion alloy layer is sufficiently relaxed by reannealing, and thus it is possible to improve workability of the steel foil for a power storage device container. The preferable aspect ratio of crystal in the surface of the diffusion alloy layer is in a range of 1.0 to 2.85.

Figure 2A:
FIG. 2A is a diagram showing an example of a large angle boundary which is a grain boundary between two crystals between which an angle difference (relative orientation difference) is equal to or more than 15°, among grain boundaries in the texture of the diffusion alloy layer before recrystallization annealing, which are measured by the EBSD method (vertical direction of a paper surface is defined as RD, a transverse direction thereof is defined as TD, and a visual field is 120 μm in RD and 100 μm in TD).
Figure 2B:
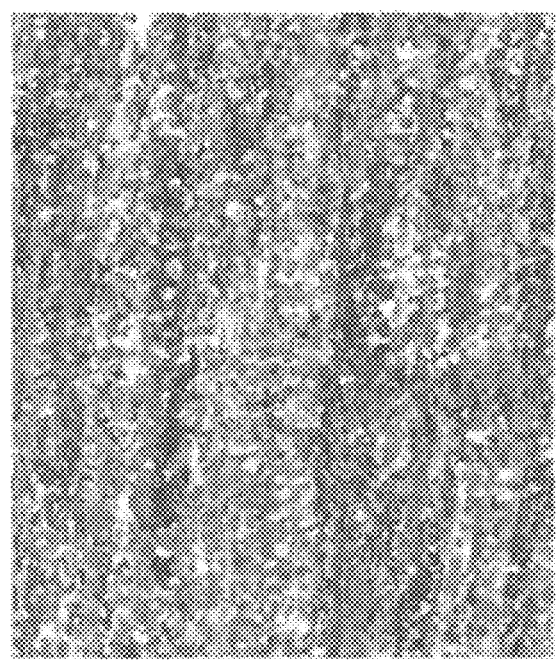
FIG. 2B is a diagram showing an example of a large angle boundary which is a grain boundary between two crystals between which an angle difference (relative orientation difference) is equal to or more than 15°, among grain boundaries in the texture of the diffusion alloy layer after recrystallization annealing, which are measured by the EBSD method (vertical direction of a paper surface is defined as RD, a transverse direction thereof is defined as TD, and a visual field is 120 μm in RD and 100 μm in TD).

The diffusion alloy layer contains fine grains. The grains are crystals in a mutual diffusion area which is formed by mutual diffusion of Fe and in the steel sheet and Ni in the Ni-plated layer during the plating after annealing, and have an aspect ratio of 1.0 to 5.0 through cold rolling and recrystallization annealing. When grains in the mutual diffusion area are stretched in the rolling direction by cold rolling, the aspect ratio of the grains is temporarily high as shown in FIG. 2A. However, when reannealing is performed after the cold rolling, strain applied to the rolled steel foil and the diffusion alloy layer during the cold rolling is relaxed, and recrystallization occurs in the diffusion alloy layer. Thus, as shown in FIG. 2B, the aspect ratio of the grains become small. When the aspect ratio of the grains of the surface of the diffusion alloy layer is in the range of 1.0 to 5.0, strain of the rolled steel foil and the diffusion alloy layer is sufficiently relaxed by recrystallization annealing.

The aspect ratio is obtained based on an EBSD orientation mapping image. The EBSD orientation mapping image is also referred to a reverse-pole orientation mapping image. Ni and Fe are mainly present in the surface of the diffusion alloy layer. However, since Fe is mainly present in a form of $FeNi_3$, Ni may be used as a database of a lattice.

Specifically, the aspect ratio is obtained by the following method. That is, an EBSD orientation mapping image which is obtained by observing the surface of the diffusion alloy layer and has a visual field of 100 μm is divided into four equal parts. 100 grains of which boundaries are clearly confirmed are randomly selected in an area of each of the parts obtained by division. The maximum length of each of the selected grains is measured horizontally and vertically. The short one of the measured lengths is set as a short axis, and the long one is set as a long axis. The short axis and the long axis are calculated, and thus are used as the aspect ratio of each of the grains. Since 100 pieces are selected in each of the areas obtained by division into four equal parts, aspect ratios of the total 400 pieces are obtained. The average value of the aspect ratios of 400 pieces is defined as the aspect ratio.

$FeNi_3$ and Fe are mainly present in the diffusion alloy layer of the steel foil for a power storage device container according to the embodiment, and further, a minute amount of pure Ni may be present.

Ni and Fe in the diffusion alloy layer are mutually diffused in an annealing process after plating and in a recrystallization annealing process after cold rolling. Most of Ni are bonded to some of Fe and forms $FeNi_3$. In the recrystallization annealing process, during heating is performed up to 750° C. or higher which is a recrystallization annealing temperature, and when the temperature of the steel foil passes through a temperature range of 500 to 700° C., $FeNi_3$ is started to be generated. Thus, as $FeNi_3$ is contained more in the diffusion alloy layer, strain of the diffusion alloy layer is sufficiently relaxed during the recrystallization annealing.

In the embodiment, a ratio ($I_{FeNi3}/I_{Ni}$) of intensity $I_{Ni}$ of a diffraction peak of Ni and intensity $I_{FeNi3}$ of a diffraction peak of $FeNi_3$ which are obtained by X-ray diffraction measurement may be used as an index for evaluating a content percentage of $FeNi_3$ in the diffusion alloy layer. Specifically, when $I_{FeNi3}/I_{Ni}$ which is a ratio (may be referred to as a diffraction intensity ratio, below) of the intensity $I_{Ni}$ of the diffraction peak of Ni and the intensity $I_{FeNi3}$ of a diffraction peak of $FeNi_3$ is equal to or more than 5.0, workability of the diffusion alloy layer is stably improved and thus is preferable. When the diffraction intensity ratio of the diffusion alloy layer is less than 5.0, that is, in a case where the amount of $FeNi_3$ is small, the strain of the rolled steel foil and the diffusion alloy layer is not sufficiently relaxed during the recrystallization annealing, and workability is lowered. Thus, the ratio of less than 5.0 is not preferable. As the X-ray diffraction peak of Ni in the diffusion alloy layer becomes small, workability of the steel foil for a power storage device container is improved. Thus, the upper limit of the diffraction intensity ratio is not required to be particularly defined. Here, diffraction peak intensity, in which a diffraction angle (2θ/θ) is observed in a vicinity of 51.8° in a case where CuKα is used as an X-ray source, is used as the intensity $I_{Ni}$ of the diffraction peak of Ni. The diffraction peak intensity, in which the diffraction angle (2θ/θ) is observed in a vicinity of 51°±0.1° in a case where CuKα is used as an X-ray source, is used as the intensity $I_{FeNi3}$ of the diffraction peak of FeNi$_3$.

When X-ray diffraction measurement is performed on the diffusion alloy layer, the diffraction peak of FeNi$_3$ is detected; however, the diffraction peak of Ni may be not detected. If the entirety of Ni forms FeNi$_3$, the diffraction peak of Ni is not observed, and the intensity $I_{Ni}$ of the diffraction peak of Ni becomes 0. In this case, calculating the diffraction intensity ratio is not possible. However, even in this case, an effect of improving workability is obtained.

Figure 3:
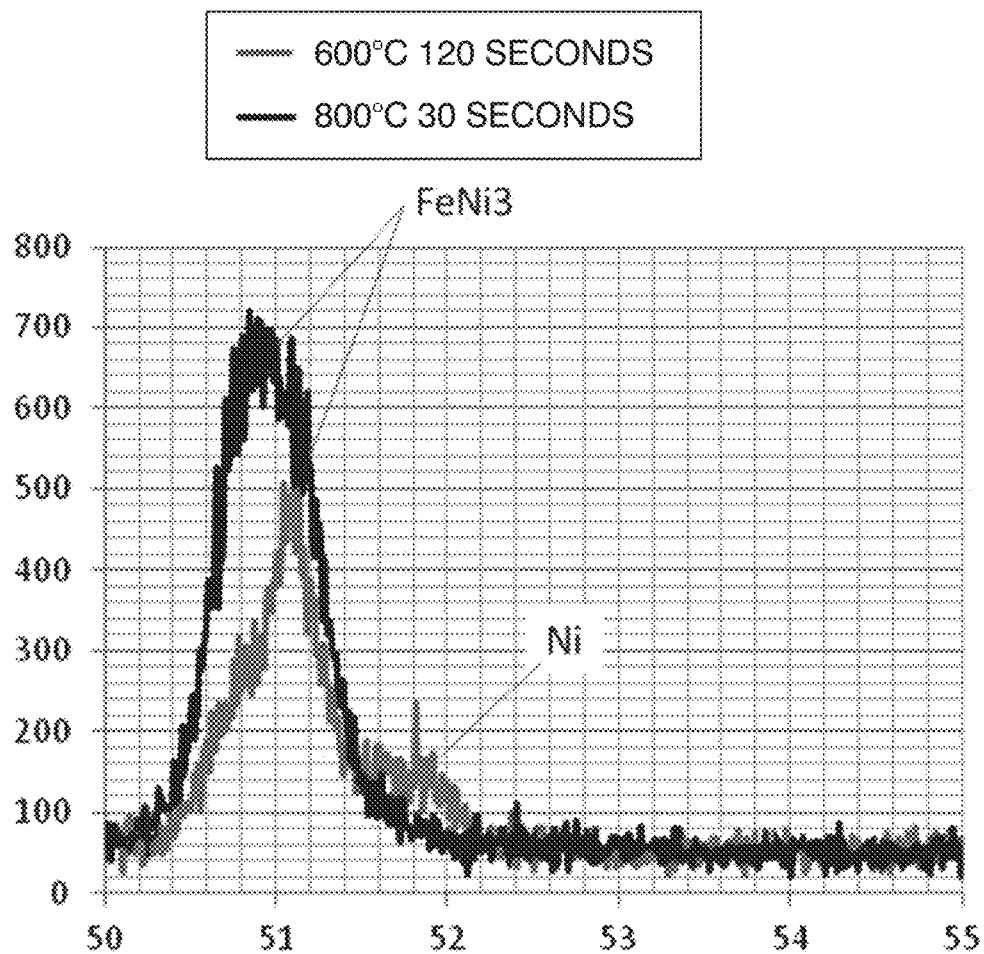
FIG. 3 is a graph showing a result of measuring X-ray diffraction of the diffusion alloy layer.

FIG. 3 shows an example of an X-ray diffraction result of the diffusion alloy layer in the steel foil for a power storage device container according to the embodiment. The X-ray source is CuKα. In a case where reannealing conditions are set to be at 600° C. (annealing temperature) for 120 seconds (annealing time), the diffraction peak of Ni is observed in the vicinity of 51.8°, and the diffraction peak of FeNi$_3$ is observed in the vicinity of 51.0°. In this case, the diffraction intensity ratio is 4.2 and it is determined that releasing strain is not sufficient. In a case where reannealing conditions are set to be at 800° C. for 30 seconds, the diffraction peak of Ni is hardly observed in the vicinity of 51.8°, and the diffraction peak of FeNi$_3$ is observed in the vicinity of 51.0°. In this case, the diffraction intensity ratio is substantially infinite and it is determined that strain is sufficiently relaxed.

In the diffusion alloy layer of the steel foil according to the embodiment, it is preferable that diffused Fe is present in the surface of the diffusion alloy layer. If Fe is diffused up to the surface of the diffusion alloy layer, and most of Ni is alloyed with Fe, and FeNi$_3$ is formed during the recrystallization annealing. If many of Fe having an α-Fe phase, not FeNi$_3$ are present in the outermost layer at an atom level, corrosion resistance is significantly damaged. Thus, it is preferable that the entirety of Fe is present in a form of FeNi$_3$. In this case, it is considered that the Fe content (abundance ratio of Fe) is in a range of about 10 atom % to 35 atom %, in a case where the total abundance ratio of Ni and Fe is set to 100 atom %. However, it is significantly difficult to obtain an element ratio on the outermost layer at an atom level by using a general analysis method such as X-ray fluorescence analysis or glow discharge emission spectroscopic analysis. Thus, in practice, the Fe abundance ratio of the surface layer is obtained by linearly extrapolating from data from the outermost surface to about 0.1 μm using measurement by the glow discharge emission spectroscopic analysis. If Fe and Ni are in a state of being in the process of being diffused, depth-direction distribution in which the amount of Fe is small in the surface, and the amount of Fe is large in substantially the inside of the layer. Thus, the abundance ratio of Fe on the outermost layer at an atom level does not necessarily coincide with the abundance ratio of Fe obtained by using a general analysis method. However, the present inventors have found that, in a case where the total content of Ni and Fe is set to 100 atom %, if the Fe content measured by a general analysis method is preferably equal to or more than 20 atom %, corrosion resistance is improved. The Fe content is more preferably equal to or more than 30 atom %. If the Fe content on the surface of the diffusion alloy layer, which is measured by the general analysis method is more than 80 atom %, since Fe concentration on the outermost layer at the atom level is also excessive, corrosion resistance against the electrolyte in the surface of the diffusion alloy layer may be degraded. Thus, the Fe content is preferably equal to or less than 80 atom %. The Fe content is more preferably equal to or less than 70 atom %.

Figure 4:
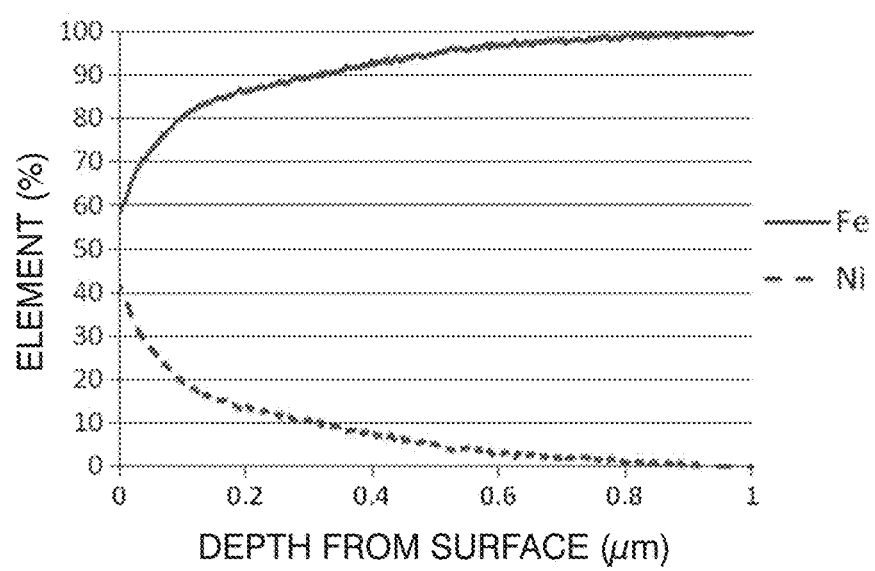
FIG. 4 is a graph showing a result obtained by analyzing a constituent metal element of the diffusion alloy layer in a depth direction.

FIG. 4 shows a metal element analysis result in the depth direction of the diffusion alloy layer. In FIG. 4, while the diffusion alloy layer is etched to depth of 1 μm by argon plasma, element analysis is performed by glow discharge emission analysis. In the diffusion alloy layer shown in FIG. 4, the Fe content from the surface to the depth of 0.1 μm is more than 60% of metal elements, and the Ni content is equal to or less than 40%. In FIG. 4, the Ni content is less than about 1.0% at a time when the depth exceeds 0.9 μm. This portion in which depth is deeper than 0.9 μm corresponds to the rolled steel foil.

If a depth in which the Ni content becomes 1.0% in the metal element analysis result in the depth direction is set as the thickness of the diffusion alloy layer, the thickness of the diffusion alloy layer is preferably equal to or more than 0.3 μm, more preferably equal to or more than 0.5 μm, and still preferably equal to or more than 1.0 μm. If the thickness of the diffusion alloy layer is less than 0.3 μm, the corrosion resistance against the electrolyte is degraded, which is not preferable.

In the diffusion alloy layer of the steel foil for a power storage device container according to the embodiment, the phase provided in the outermost layer may have a fcc structure. For example, even a diffusion alloy layer in a case where FeNi$_3$ and Fe are provided together may be used as long as almost of the outermost layer at a level of several tens nm is FeNi$_3$. According to such a diffusion alloy layer, it is possible to specify polar density based on the above-described method and definitions, by using a FeNi$_3$ pattern, even in an alloy diffusion layer in which FeNi$_3$ and Fe are provided together.

The adhered amount of Ni in the diffusion alloy layer of the steel foil according to the embodiment is preferably equal to or more than 0.3 g/m$^2$, more preferably equal to or more than 1.3 g/m$^2$, and still preferably equal to or more than 2.7 g/m$^2$. When the adhered amount is set to be equal to or more than 0.3 g/m$^2$, it is possible to improve corrosion resistance against a corrosion-causing substance included in an organic electrolyte. If the adhered amount is less than 0.3 g/m$^2$, corrosion resistance against a corrosion-causing substance included in an organic electrolyte is not sufficiently obtained. In addition, specifying texture by the EBSD method is also difficult.

The adhered amount of Ni in the diffusion alloy layer is measured by a fluorescent X-ray test method which is defined based on JIS H8501. More detailed, the adhered amount of Ni in the diffusion alloy layer in this specification is indicated by a value obtained by measuring Kα fluorescent X-ray intensity of Ni from the surface of the diffusion alloy layer by the fluorescent X-ray test method and converting X-ray intensity into a the adhered amount of Ni in the diffusion alloy layer.

As a calibration curve for converting the fluorescent X-ray intensity into the adhered amount, a calibration curve created as follows is used. A steel sheet having the same type as the substrate is set as a standard test material in which the adhered amount of Ni is 0, and an alloyed and plated steel sheet is obtained by annealing a Ni-plated steel sheet in which pure Ni having a predetermined amount is adhered to the same steel at 800° C. at a reducing atmosphere for 30 seconds as the standard test material. By measuring these standard test materials, the calibration curve is created. Strictly, if the adhered amount of Ni is measured and converted by using the calibration curve obtained by using the standard test material, regarding a material in which alloying proceeds more than that in the standard test material, the adhered amount of Ni is measured lower than the actual adhered amount of Ni. Regarding a material in which alloying does not proceed more than that in the standard test material, the adhered amount of Ni is measured more than the actual adhered amount of Ni. However, in the present invention, since foil rolling causes Ni to be distributed only in the surface layer which is thinner than general plating layer, and thus an influence of alloying is slight. Thus, the adhered amount of Ni in the diffusion alloy layer is defined based on the adhered amount of Ni measured in such a manner.

The upper limit of the adhered amount of Ni in the diffusion alloy layer is not particularly limited. However, in consideration of cost, the upper limit of the adhered amount of Ni is preferably equal to or less than 5 g/m$^2$. In the steel foil according to the embodiment, a significant effect is obtained, even though the adhered amount of Ni is such small.

In a case where texture is not formed in a diffusion alloy layer in the related art, if the adhered amount of Ni is less than about 9 g/m$^2$ even at the minimum, an effect of improving the corrosion resistance against the corrosion-causing substance included in the organic electrolyte is not desired. In addition, the improvement effect in the related art is smaller than the improvement effect in the present invention. In the related art, only a slight improvement effect is obtained with an increase of the adhered amount of Ni, and even when the adhered amount is increased up to about 90 g/m$^2$, the significant improvement effect which is equivalent to that in the steel foil according to the embodiment is not obtained. In the embodiment, since the diffusion alloy layer has the specific texture, the corrosion resistance against a nonaqueous electrolyte is largely improved, and electrolyte resistance is improved.

The total thickness (that is, thickness of the substrate) of the rolled steel foil and the diffusion alloy layer in the steel foil for a power storage device container according to the embodiment is equal to or less than 200 μm. The thickness of the substrate is preferably equal to or less than 100 μm, and more preferably equal to or less than 50 μm. This is because a thin container is desired with reducing the size and weight of a battery. The lower limit is not particularly limited. However, in consideration of cost or uniformity of the thickness, normally, the lower limit is desirably equal to or more than 5 μm.

<Chromium-Based Surface Treatment Layer>

The steel foil for a power storage device container according to the embodiment includes a chromium-based surface treatment layer on the surface of the diffusion alloy layer. The thickness of the chromium-based surface treatment layer is preferably set to be 2 nm to 200 nm, more preferably set to be 5 nm to 60 nm, and still preferably set to be 8 nm to 40 nm. The chromium-based surface treatment layer may be formed on at least a single surface, but may be formed on both surfaces.

In a case where the thickness of the chromium-based surface treatment layer is uniformly less than 2 nm or is ununiformly partially less than 2 nm, or has a pin hole, when a polyolefin-based resin layer is formed on the surface of the chromium-based surface treatment layer in the steel foil according to the embodiment, in order to use the chromium-based surface treatment layer as a material of the power storage device container, an adhesion force between the polyolefin-based resin layer and the substrate in the nonaqueous electrolyte may be insufficient, and thus exfoliation may be caused. If the thickness of the chromium-based surface treatment layer is thicker than 200 nm, cracks may occur in the chromium-based surface treatment layer when the steel foil for a power storage device container is processed. Thus, an adhesion force between the polyolefin-based resin layer and the substrate in the nonaqueous electrolyte may be insufficient, and thus exfoliation may be caused. On the other hand, if the chromium-based surface treatment layer is thicker than necessary, there is a disadvantage in that the amount of chromate or a chromium-based compound used has a large environmental load.

The thickness of the chromium-based surface treatment layer is measured in such a manner that a present state of an element is examined by XPS analysis (X-ray photoelectron spectroscopic analysis). Specifically, based on a result of the XPS analysis, the depth from the surface layer until a Ni element is detected is set to be the thickness of the chromium-based surface treatment layer. In a case where the polyolefin-based resin layer is provided on the surface, the surface is diagonally cut off, and the obtained cross section is subjected to the XPS analysis.

<Polyolefin-Based Resin Layer>

The steel foil for a power storage device container according to the embodiment may further include a polyolefin-based resin layer on the surface of the chromium-based surface treatment layer.

Specific examples of the polyolefin-based resin layer may include low density polyethylene, medium density polyethylene, high density polyethylene, linear low-density polyethylene, cross-linked polyethylene, polypropylene, or a mixture of two or more of these substances.

The polyolefin-based resin layer may be a single layer or a multi-layer. A resin such as polyolefin, polyester, polyamide, and polyimide may be applied on the polyolefin-based resin layer so as to form a multiple layer.

A range of the thickness of the polyolefin-based resin layer is preferably 0.5 to 200 μm, and is more preferably 15 to 100 μm. Even in a case where layers of polyolefin, polyester, polyamide, and polyimide are stacked over the polyolefin-based resin layer, a range of the thickness of all of the stacked layers is preferably 0.5 to 200 μm, and more preferably 15 to 100 μm. If the thickness of all of the layers is less than 0.5 μm, an effect of preventing permeation of the corrosion-causing substance included in the nonaqueous electrolyte may not be obtained. If the thickness of all of the layers is thicker than 200 μm, for example, as in a case where workability becomes worse, the polyolefin-based resin layer is inappropriate as a member for a secondary battery container, and showing an economical advantage is difficult (cost is increased).

The tensile strength of the steel foil for a power storage device container according to the embodiment is desirably 200 to 1200 MPa. In a case where the tensile strength of the steel foil for a power storage device container is less than 200 MPa, since the strength in a case of being used as a power storage device container is insufficient, advantages obtained by using the steel foil are decreased. If the tensile strength of the steel foil for a power storage device container is more than 1200 MPa, handling the steel foil is difficult.

Here, the tensile strength is measured by using a method which is based on a method used in evaluating a sheet material among tensile test methods of a metal materials, which are defined at a normal temperature in JIS Z2241. In a case of the steel foil, since roughness of an end surface has a significantly large influence, the roughness of surface finish on the end surface is required to be as small as possible when a test piece is manufactured. Thus, in a tensile test of a foil, a test piece based on JIS 13B is processed so as to cause roughness of an end surface to be set to be equal to or less than 0.2 μm in Ra. Then, the test piece is provided to the tensile test. A method of adjusting roughness is not limited. However, in the embodiment, a test piece is manufactured by a method in which a target steel foil is chucked and fixed on both sides, between thin steel sheets having a thickness of about 1 mm, and Fraise finishing is performed on an end surface.

Next, a power storage device container according to the embodiment will be described.

A power storage device container according to the embodiment includes a steel foil for a power storage device according to the embodiment, which further includes the polyolefin-based resin layer on the surface of the chromium-based surface treatment layer. Specifically, the power storage device container is obtained in such a manner that the steel foil for a power storage device according to the embodiment, which includes the polyolefin-based resin layer is formed to have a shape as indicated by, for example, the reference symbol of 21 in FIG. 8 by using a well-known method. Since a chemical composition or a structure is not changed by formation, the chemical composition or the structure of the power storage device container according to the embodiment is equivalent to that of the steel foil for a power storage device according to the embodiment.

Next, a power storage device according to the embodiment will be described.

Figure 8:
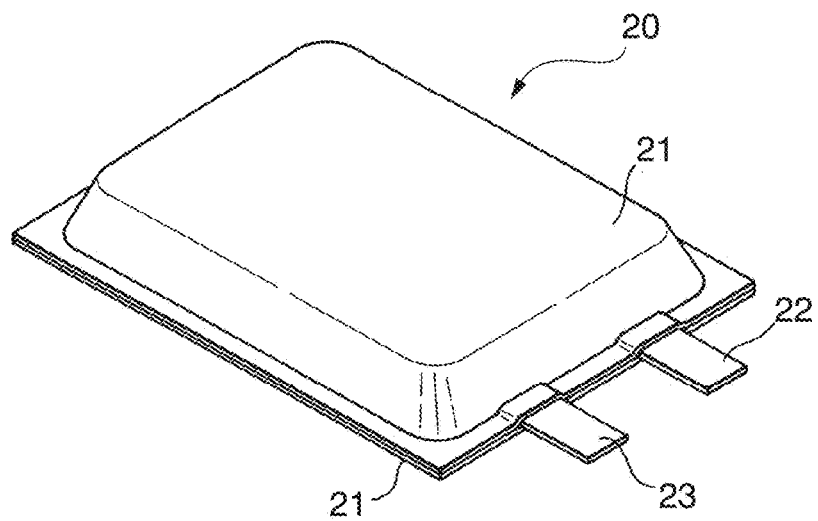
FIG. 8 shows an example of a power storage device including the power storage device container according to the embodiment.

A power storage device according to the embodiment includes a power storage device container. For example, as shown in FIG. 8, A power storage device according to the embodiment is obtained by storing at least a positive electrode, a negative electrode, which are dipped in an electrolyte, and a member constituting a battery are stored in a power storage device container 21 and by providing a positive lead 22 connected to the positive electrode, a negative lead 23 connected to the negative electrode, and the like.

Figure 5:
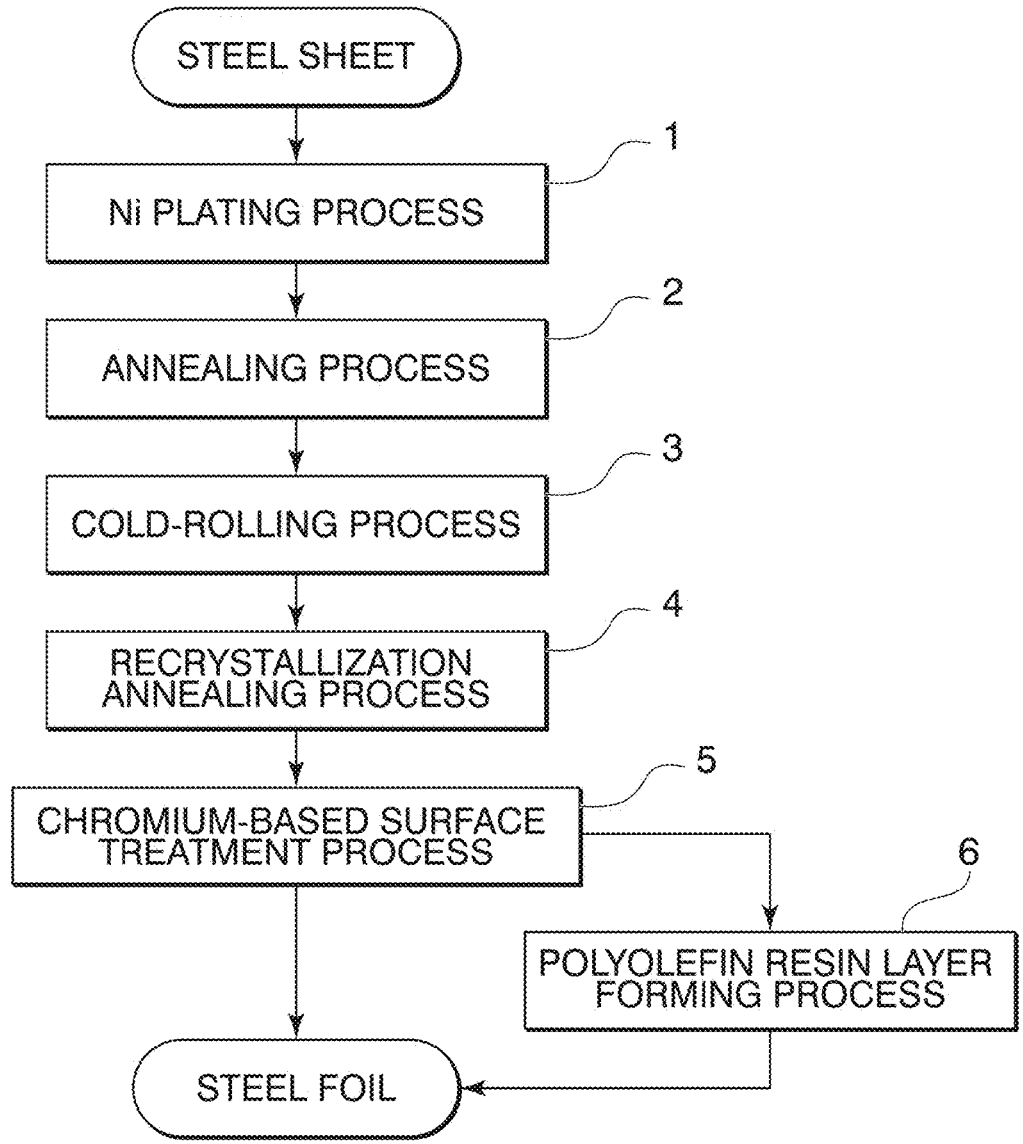
FIG. 5 is a flowchart showing a manufacturing method of a steel foil according to the present invention.

Next, a manufacturing method of a steel foil for a power storage device container, according to the embodiment will be described. As shown in FIG. 5, a manufacturing method of a steel foil for a power storage device container according to the embodiment includes a nickel-plating process of performing nickel-plating on a steel sheet, an annealing process of making Ni in the Ni-plated layer and Fe in the steel sheet to be mutually diffused after nickel plating, a cold-rolling process of cold rolling a steel sheet so as to obtain a foil, a recrystallization annealing process, and a chromium-based surface treatment process. By performing such processes, it is possible to manufacture a foil including a diffusion alloy layer according to the embodiment, in which specific texture is provided and the aspect ratio of crystal in the surface is 1.0 to 5.0. After the recrystallization annealing process, a temper rolling process may be performed so as to adjust the foil strength (tensile strength of the steel foil). In addition, the manufacturing method of a steel foil for a power storage device container according to the embodiment may further include a process of stacking a polyolefin resin layer after the chromium-based surface treatment process.

Preferable conditions in each of the processes will be described.

(Nickel-Plating Process)

A steel sheet obtained by a well-known method is subjected to nickel plating in order to obtain a steel foil according to the embodiment. The steel sheet at this time may be a cold-rolled steel sheet as cold-rolled, or may be a cold-rolled steel sheet after annealing. A forming method of nickel plating is not particularly limited. However, an electro-plating method is preferable from a point of cost. A plating bath used in electro-plating is not particularly limited. However, the Watt bath formed of nickel sulfate, nickel chloride, and boric acid is appropriate from a viewpoint of manufacturing cost or adhered-amount controllability. As the Watt bath, for example, a Watt bath which contains 200 to 400 g/l of nickel sulfate, 20 to 100 g/l of nickel chloride, and 5 to 50 g/l of boric acid may be used.

The adhered amount of a nickel-plated layer obtained by performing the nickel-plating process on a steel sheet is desirably equal to or more than 1 $g/m^2$. If the adhered amount is less than 1 $g/m^2$, a coating ratio is decreased by the post cold rolling, and thus corrosion resistance against the corrosion-causing substance included in the organic electrolyte may be degraded. In addition, the Ni content in the diffusion alloy layer of the steel foil may be less than 0.3 $g/m^2$ after cold rolling. The upper limit is restricted by cost. However, normally, the upper limit is preferably equal to or less than 50 $g/m^2$. The adhered amount of the nickel-plated layer before cold rolling is more preferably 10 to 30 $g/m^2$. However, even though the adhered amount of the nickel-plated layer before cold rolling is more than 50 $g/m^2$, a desired steel foil relating to a metallographic structure and metal characteristics may be obtained.

(Annealing Process)

A steel sheet (Ni-plated steel sheet) obtained by forming a nickel-plated layer in the nickel-plating process is subjected to annealing in the annealing process, so that Ni in nickel plating and Fe in the steel sheet are mutually diffused. Recrystallization may proceed in the process of mutual diffusion. The recrystallization by annealing after nickel plating means (1) recrystallization of both of the steel sheet and the nickel-plated layer in a case where an original plate before nickel plating is a plate which is not subjected to annealing yet, and means (2) recrystallization of the nickel-plated layer in a case where an original plate before nickel plating is an annealed plate. If recrystallization temperatures of the nickel-plated layer and the steel sheet are compared to each other, normally, the recrystallization temperature of the nickel-plated layer is lower. This is because strain applied to the nickel-plated layer in the nickel-plating process functions as a driving force of recrystallization.

It may be confirmed whether or not recrystallization occurred, by observing a structure or by measuring a hardness change. For example, the nickel-plated layer has Vickers hardness of about 250 to 300 Hv in a state of being generated by electro-plating. However, if recrystallization occurs by annealing, the Vickers hardness is reduced to be equal to or less than 200 Hv. An appropriate annealing condition is determined by a product of the temperature and a time. That is, when temperature is high, annealing for a relatively short time is required, and when temperature is low, annealing for a relatively long time is required. As a specific annealing method, there are box annealing and continuous annealing. It may be determined whether or not mutual diffusion occurs, based on a result of element analysis by the glow discharge emission analysis.

Regarding the box annealing, treatment for a short time is not possible due to facility characteristics. Thus, in a case of box annealing, normally, treatment is performed for a long time of several hours to several days. The sheet temperature in box annealing is low, specifically, is set to 500 to 700° C. in many cases. Regarding continuous annealing, treatment is preferably performed for a short time in order to improve productivity. Thus, in a case of continuous annealing, normally, treatment is performed for a short time of several seconds to several minutes in many cases. The sheet temperature in continuous annealing is high, specifically, is set to 700 to 900° C. in many cases. In the annealing process, any of box annealing and continuous annealing may be performed as long as an appropriate temperature and an appropriate time are controlled so as to cause mutual diffusion to occur. In a case where annealing is not performed under an appropriate condition, exfoliation of Ni plating easily occurs in the subsequent cold-rolling process. In addition, obtaining texture in which the <111> orientation is parallel to the rolling direction is not possible.

(Cold-Rolling Process)

Cold rolling is performed on the Ni-plated steel sheet after the annealing process so as to obtain a foil having a thickness which is equal to or less than 200 μm, preferably equal to or less than 100 μm, and more preferably equal to or less than 20 μm. In the cold rolling after annealing, by controlling the rolling reduction on each pass as will be described later, texture in which the <111> orientation in which the <111> polar density in the reverse pole figure in the rolling direction is 2.0 to 6.0 is parallel to the rolling direction is formed.

Cumulative rolling reduction (total cumulative rolling reduction) until the final pass of cold rolling is equal to or more than 70%, and preferably equal to or more than 90%. Here, the cumulative rolling reduction is a percentage of cumulative reduction (difference between the thickness of an inlet plate before the first pass, and the thickness of an outlet after the current pass) until the current pass, to the thickness of an inlet plate on the first rolling pass. If the cumulative rolling reduction until the final pass is small, a desired texture is not obtained. The upper limit of the cumulative rolling reduction until the final pass is not particularly limited. However, about 98% is the limit in a point of general rolling capability.

Cold rolling is performed on plural number of passes. When the number of rolling passes is set to be large, it is possible to prevent an occurrence of defect or breaking in manufacturing processes. The rolling reduction in each pass in a case where cold rolling is performed on plural number of passes is not required to be particularly limited, and rolling may be performed on any rolling schedule. However, it is preferable to obtain a structure having small disorder by performing a rolling on a plural number of passes, in order to align the <111> orientation in the rolling direction so as to form a dense alloy layer, and to improve electrolyte resistance. Specifically, the rolling reduction is preferably controlled on each rolling stand in a case where cold rolling is performed on plural number of passes. For example, it is preferable that the number of times of rolling passes is set to be equal to or more than at least 7 passes, the rolling reduction on the first rolling pass is set to be equal to or less than 30%, the cumulative rolling reduction on the fourth rolling pass is set to be equal to or less than 70%, and a difference in cumulative rolling reduction between a rolling pass before two passes from the final pass, and the final pass is set to be equal to or less than 5%.

When the number of rolling passes is set to be equal to or more than at least 7 passes, it is possible to reduce the rolling reduction per one rolling pass. When the rolling reduction on the first rolling pass is set to be equal to or less than 30%, and the cumulative rolling reduction on rolling passes until the fourth rolling pass (including the fourth rolling pass) is set to be equal to or less than 70%, the cumulative rolling reduction on the first half of the rolling passes can be suppressed so as to be equal to or less than 70%, and the cumulative rolling reduction is set not to be excessively increased. Further, when the difference between the cumulative rolling reduction on the rolling pass before two passes from the final pass, and the cumulative rolling reduction on the final pass is set to be equal to or less than 5%, it is possible to perform rolling while suppressing the rolling reduction on the second half more than that on the first half. In these cases, it is possible to obtain a structure having less disorder.

(Recrystallization Annealing Process)

After the cold rolling, recrystallization annealing is performed so as to adjust the aspect ratio of crystal in the surface of the diffusion alloy layer to be in a range of 1.0 to 5.0. As the recrystallization annealing, continuous annealing in which a steel foil is continuously fed into an annealing furnace may be performed. If the annealing temperature in the recrystallization annealing process is too low, adjusting the aspect ratio to be in a range of 1.0 to 5.0 is not possible, and improving workability is not possible. If the annealing temperature is too high, creep elongation occurs, and thus a steel foil passing through an inside of the annealing furnace is not possible. In addition, the texture of the diffusion alloy layer may be broken. If the annealing time is too short even though the annealing temperature is appropriate, adjusting the aspect ratio to be in a range of 1.0 to 5.0 is not possible. If the annealing time is too long even though the annealing temperature is appropriate, the effect of improving the workability is saturated. The annealing temperature in recrystallization annealing is in a range of 750 to 1100° C., preferably in a range of 800 to 1000° C., and more preferably in a range of 800 to 900° C. The annealing time is in a range of 4 to 120 seconds, preferably in a range of 10 to 60 seconds, and more preferably in a range of 15 to 30 seconds. The annealing time is a holding time at the annealing temperature. In a case where the annealing temperature is low, the required annealing time becomes longer. Thus, when the annealing time (second) is set as Tc, and the annealing temperature (° C.) is set as Ta, Tc and Ta are required to satisfy the following expression (1) in a case of 750≤Ta≤800, and to satisfy the following expression (2) in a case of Ta>800.

$$Tc \geq 13 - 0.1 \times (Ta - 750) \quad (1)$$

$$Tc \geq 8 - (4/300) \times (Ta - 800) \quad (2)$$

In order to set the aspect ratio to be 1.0 to 5.0 more stably, and set the diffraction intensity ratio to be equal to or more than 5.0, when the annealing time (second) is set as Tc, and the annealing temperature (° C.) is set as Ta, Tc and Ta preferably satisfy the following expression (3) in a case of 750≤Ta≤800, and satisfy the following expression (4) in a case of Ta>800.

$$Tc \geq 16 - 0.1 \times (Ta - 750) \quad (3)$$

$$Tc \geq 11 - 0.02 \times (Ta - 800) \quad (4)$$

There are cases that the foil strength is less than the above-described preferable range (200 to 1200 MPa) after recrystallization annealing. However, even in this case, the corrosion resistance of an organic electrolyte is not damaged.

Figure 6A:
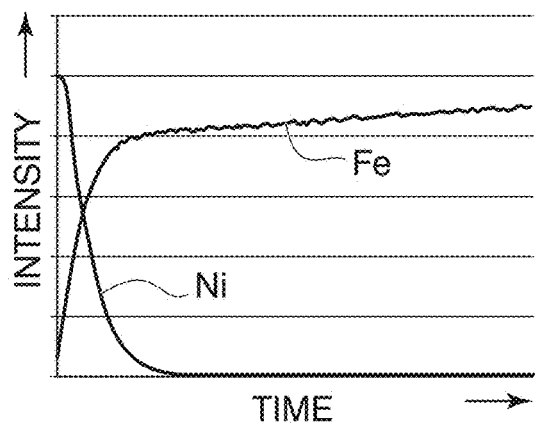
FIG. 6A is a graph showing a result obtained by analyzing the constituent metal element of the diffusion alloy layer in the depth direction, and shows an example in which a reannealing process is not performed.
Figure 6B:
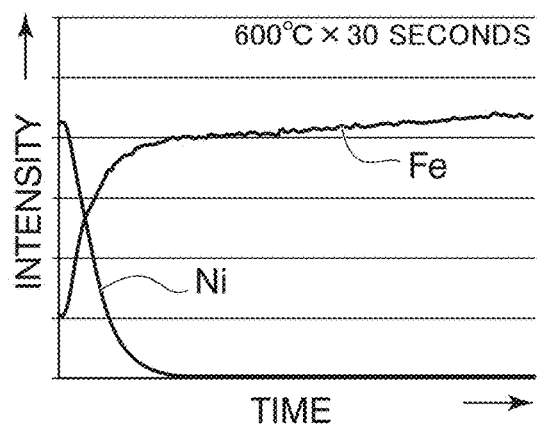
FIG. 6B is a graph showing a result obtained by analyzing the constituent metal element of the diffusion alloy layer in the depth direction, and shows an example in which reannealing conditions are set to be 600° C. for 30 seconds.
Figure 6C:
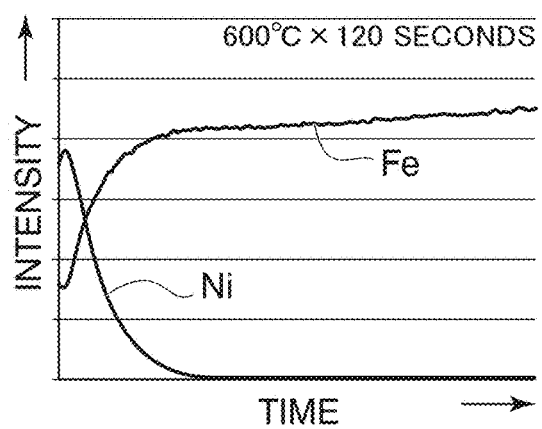
FIG. 6C is a graph showing a result obtained by analyzing the constituent metal element of the diffusion alloy layer in the depth direction, and shows an example in which reannealing conditions are set to be 600° C. for 120 seconds.
Figure 6D:
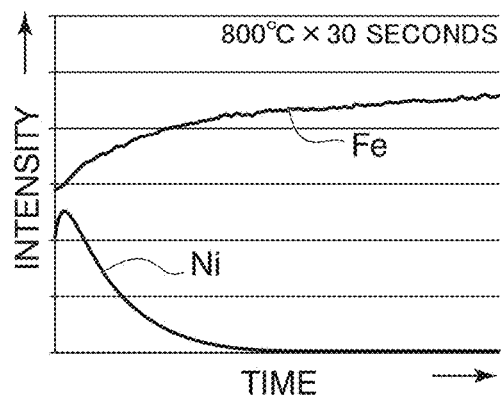
FIG. 6D is a graph showing a result obtained by analyzing the constituent metal element of the diffusion alloy layer in the depth direction, and shows an example in which the reannealing conditions are set to 800° C. for 30 seconds.
Figure 6E:
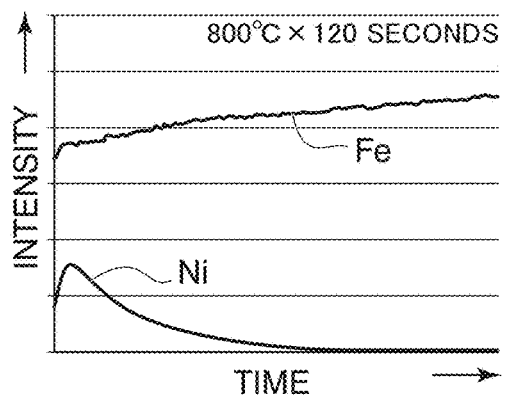
FIG. 6E is a graph showing a result obtained by analyzing the constituent metal element of the diffusion alloy layer in the depth direction, and shows an example in which reannealing conditions are set to 800° C. for 120 seconds.

FIGS. 6A to 6E show examples of metal element analysis result in the depth direction of the diffusion alloy layer. Similarly to the case of FIG. 4, while the diffusion alloy layer is etched by argon plasma, element analysis is performed by glow discharge emission analysis. In FIGS. 6A to 6E, a horizontal axis indicates an etching time, and a vertical axis indicates detection intensity of each element. The vertical axis in FIGS. 6A to 6E indicates detection intensity, not an atom radio. FIG. 6A shows the diffusion alloy layer which is not subjected to recrystallization annealing. FIG. 6B shows an example in which a recrystallization annealing condition is set to 600° C. for 30 seconds. FIG. 6C shows an example in which the recrystallization annealing condition is set to 600° C. for 120 seconds. FIG. 6D shows an example in which the recrystallization annealing condition is set to 800° C. for 30 seconds. FIG. 6E shows an example in which the recrystallization annealing condition is set to 800° C. for 120 seconds.

As shown in FIG. 6A, in a case where recrystallization annealing is not performed, Fe concentration of the surface of the diffusion alloy layer is substantially 0. Since annealing is performed after plating in this example, it is possible to confirm that mutual diffusion of Ni and Fe is caused.

As shown in FIGS. 6B to 6E, it is understood that Fe is diffused to the surface of the diffusion alloy layer while the temperature of the recrystallization annealing increases, and the annealing time becomes longer.

In this manner, the recrystallization annealing can cause the aspect ratio of crystal in the diffusion alloy layer to be 1.0 to 5.0, and cause mutual diffusion of Fe and Ni to proceed more.

In the embodiment, in order to secure corrosion resistance against a corrosion-causing substance included in an organic electrolyte, at a high level, and to improve workability, as described above, it is important that the cumulative rolling reduction in cold rolling is controlled to be in a specific range, and recrystallization annealing is performed.

(Chromium-based Surface Treatment Process)

Chromium-based surface treatment is performed on the steel foil after recrystallization annealing. The chromium-based surface treatment includes trivalent chromium treatment, chromate treatment, and the like.

As a specific method of the chromium-based surface treatment, a method of performing coating with an aqueous solution in which chromium oxide is used as the main component, an aqueous solution in which chromium oxide and phosphoric acid is used as the main component, and the like, and a method of performing electrolytic chromate treatment may be exemplified. In addition, as a well-known chromium-based surface treatment method in the related art, for example, a method in which coating with an aqueous solution in which chromium oxide and polyacrylic acid is used as the main component is performed, and heating and drying is performed may be also exemplified. However, the method is not limited to the above-described methods.

(Polyolefin Resin Layer Forming Process)

A polyolefin resin layer may be formed on the steel foil subjected to the chromium-based surface treatment process. The polyolefin resin layer may be stacked by a thermal laminate method.

A steel foil for a power storage device container manufactured in this manner is further subjected to press forming and the like, and is processed to be a power storage device container. Then, an electrode is inserted into the power storage device container, and a nonaqueous electrolyte such as an organic electrolyte is injected, thereby a power storage device is manufactured. For example, it is possible to manufacture a lithium-ion secondary battery by using a positive electrode and a negative electrode which can store and emit lithium ions as electrodes, and using an organic electrolyte including a lithium salt as an electrolyte. It is possible to manufacture a capacitor by combination of an electrode formed of activated carbon, and an organic electrolyte.

EXAMPLES

Next, examples of the present invention will be described. However, conditions in the examples are just a condition example which is employed in order to confirm feasibility and effects of the present invention. The present invention is not limited to the condition example. The present invention may employ various conditions as long as the object of the present invention is achieved, without departing from the gist of the present invention.

Examples 1 to 17 and Comparative Examples 1 to 3 and 5 and 6

A cold-rolled steel sheet (not-annealed material) having an element composition shown in Table 1 was subjected to degreasing and pickling, and then was subjected to Ni plating by using an electro-plating method.

In Ni plating, nickel-plated layers having various adhered amounts were formed at a bath temperature of 65° C. and current density of 20 A/dm$^2$, by using a plating bath which contains 320 g/l of nickel sulfate, 70 g/l of nickel chloride, and 40 g/l of boric acid. Then, continuous annealing treatment was performed under an atmosphere of 5% $H_2$ (remainder $N_2$) at a predetermined temperature for a predetermined time. Then, cold rolling was performed at predetermined cumulative rolling reduction, and recrystallization annealing was performed under an atmosphere of 5% $H_2$ (remainder $N_2$), thereby a foil was manufactured. Table 2 shows the thickness of an original sheet, the adhered amount of the nickel-plated layer (Ni-plated amount), which was measured by a fluorescent X-ray analysis device, an annealing condition, the cumulative rolling reduction, the thickness of the obtained foil, and a recrystallization annealing condition.

Table 3 is a table which shows reduction patterns indicating the cumulative rolling reduction until each of the rolling passes in cold rolling. For example, Example 1 shows that, since the final cumulative rolling reduction is 95%, and the reduction pattern is a reduction pattern A5, the total 14 passes were performed as shown in Table 3.

TABLE 1

| | Steel element (mass %) remainder Fe and impurities | | | | | | | | |
|---|---|---|---|---|---|---|---|---|---|
| | C | Si | Mn | P | S | Al | N | Ti | Nb |
| Al-k | 0.01 | 0.007 | 0.11 | 0.012 | 0.009 | 0.09 | 0.002 | — | — |
| IF | 0.0019 | 0.009 | 0.09 | 0.012 | 0.0042 | 0.045 | 0.002 | 0.02 | 0.019 |

TABLE 2

| | | Original sheet | | Adhered amount of | Annealing condition after plating | | Total cumulative | Reduction | Foil thick- | Recrystallization annealing condition | | |
|---|---|---|---|---|---|---|---|---|---|---|---|---|
| | | Element | Sheet thickness (mm) | Ni-plated layer g/m² | Temperature (° C.) | Time (s) | rolling reduction % | pattern | ness μm | Temperature (° C.) | Time (s) | Note |
| Examples | 1 | Al-k | 0.3 | 27 | 750 | 60 | 95 | A5 | 15 | 800 | 15 | |
| | 2 | Al-k | 0.3 | 27 | 750 | 60 | 95 | A5 | 15 | 800 | 30 | |
| | 3 | Al-k | 0.3 | 27 | 750 | 60 | 95 | A5 | 15 | 800 | 60 | |
| | 4 | Al-k | 0.3 | 27 | 750 | 60 | 95 | A5 | 15 | 800 | 120 | |
| | 5 | Al-k | 0.3 | 27 | 750 | 60 | 95 | A5 | 15 | 750 | 30 | |
| | 6 | Al-k | 0.3 | 27 | 750 | 60 | 95 | A5 | 15 | 1100 | 30 | |
| | 7 | Al-k | 0.3 | 27 | 750 | 60 | 95 | A5 | 15 | 750 | 120 | |
| | 8 | Al-k | 0.3 | 27 | 750 | 60 | 95 | A5 | 15 | 1100 | 5 | |
| | 9 | Al-k | 0.2 | 50 | 750 | 60 | 90 | A4 | 20 | 800 | 30 | |
| | 10 | Al-k | 0.3 | 27 | 750 | 60 | 90 | A4 | 30 | 800 | 30 | |
| | 11 | Al-k | 0.3 | 18 | 750 | 60 | 85 | A3 | 45 | 800 | 30 | |
| | 12 | IF | 0.1 | 15 | 820 | 40 | 70 | A1 | 30 | 800 | 30 | |
| | 13 | IF | 0.2 | 18 | 820 | 40 | 80 | A2 | 40 | 800 | 30 | |
| | 14 | Al-k | 2.0 | 27 | 750 | 60 | 95 | A5 | 100 | 800 | 30 | |
| | 15 | Al-k | 0.3 | 9 | 750 | 60 | 95 | A5 | 15 | 800 | 30 | |
| | 16 | Al-k | 0.2 | 1 | 750 | 60 | 70 | A1 | 60 | 800 | 30 | |
| | 17 | Al-k | 0.3 | 18 | 750 | 60 | 85 | A3 | 45 | 750 | 15 | |
| Comparative Examples | 1 | Al-k | 0.3 | 18 | 750 | 60 | 85 | B2 | 45 | 600 | 30 | |
| | 2 | Al-k | 0.3 | 18 | 750 | 60 | 85 | B2 | 45 | 1150 | 30 | |
| | 3 | Al-k | 0.3 | 18 | 750 | 60 | 85 | B2 | 45 | 750 | 10 | |
| | 4 | Al-k | 0.3 | 0 | 750 | 60 | 95 | B4 | 15 | 800 | 30 | No Ni plating |
| | 5 | Al-k | 0.1 | 5 | 750 | 60 | 0 | — | 100 | 800 | 30 | No cold rolling |
| | 6 | Al-k | 0.1 | 5 | 750 | 60 | 60 | B1 | 40 | 800 | 30 | Insufficient reduction of cold rolling |
| | 7 | Al-k | 0.2 | 9 | — | — | 90 | B3 | 20 | 800 | 30 | Rolling without annealing after Ni plating |
| | 8 | Al-k | 0.02 | 9 | — | — | — | — | 20 | — | — | Ni plating on foil |
| | 9 | Al-k | 0.02 | 9 | — | — | — | — | 20 | 800 | 300 | Ni plating and annealing on foil |

TABLE 3

| Reduction pattern | Total cumulative rolling reduction | Number of rolling passes | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 |
| A1 | 70 | 0 | 30 | 50 | 60 | 65 | 67 | 69 | 70 | | | | | | | |
| A2 | 80 | 0 | 30 | 50 | 60 | 70 | 75 | 77 | 79 | 80 | | | | | | |
| A3 | 85 | 0 | 30 | 50 | 60 | 70 | 75 | 80 | 83 | 84 | 85 | | | | | |
| A4 | 90 | 0 | 30 | 50 | 60 | 70 | 75 | 80 | 83 | 86 | 89 | 90 | | | | |
| A5 | 95 | 0 | 30 | 50 | 60 | 70 | 75 | 80 | 83 | 86 | 90 | 91 | 92 | 93 | 94 | 95 |
| B1 | 60 | 0 | 50 | 55 | 60 | | | | | | | | | | | |
| B2 | 85 | 0 | 30 | 50 | 60 | 70 | 75 | 80 | 83 | 84 | 85 | | | | | |
| B3 | 90 | 0 | 50 | 70 | 85 | 87 | 90 | | | | | | | | | |
| B4 | 95 | 0 | 50 | 70 | 85 | 90 | 92 | 95 | | | | | | | | |

Comparative Example 4

Continuous annealing treatment was performed under an atmosphere of 5% $H_2$ (remainder $N_2$) at a predetermined temperature for a predetermined time without performing nickel plating, by using a cold-rolled steel sheet (not-annealed material) having an element composition Al-k shown in Table 1. Then, cold rolling was performed at predetermined cumulative rolling reduction, and recrystallization annealing was performed under an atmosphere of 5% $H_2$ (remainder $N_2$), thereby a foil was manufactured.

Comparative Example 7

Ni plating was performed under the same condition as that in the previous example, by using a cold-rolled steel sheet (not-annealed material) having an element composition Al-k shown in Table 1. Then, continuous annealing was not performed, and cold rolling and recrystallization annealing was performed, thereby a foil was manufactured.

Comparative Examples 8 and 9

Ni plating was performed under the same condition as that in the previous example, by using a foil having thickness of 20 μm, which has an element composition Al-k shown in Table 1. Then, the continuous annealing process and cold rolling was not performed. Recrystallization annealing was not performed in Comparative Example 8, and was performed in Comparative Example 9. In this manner, foils of Comparative Examples 8 and 9 were manufactured.

Regarding the steel foils, the Ni adhered amount of the diffusion alloy layer, texture, an XRD intensity ratio, an aspect ratio, workability, and electrolyte resistance were evaluated. Evaluation methods are as follows.

(Evaluation Method)

The amount of Ni adhered to the diffusion alloy layer:

The amount was quantized by a fluorescent X-ray analysis device, by using a method similar to a method used for measuring the adhered amount of the nickel-plated layer in the steel sheet. Specifically, a square sample of which one side is 35 mm was cut out and Kα fluorescent X-ray intensity of Ni was measured from the surface of the diffusion alloy layer at a mask diameter of 30 mmφ, by using the fluorescent X-ray analysis device ZSX-100e (Rigaku Corporation). Ni adhered amount of the diffusion alloy layer is obtained by converting the result into the adhered amount using calibration curves which is created by measuring the above steel and a standard material obtained in a manner that pure Ni plating and alloyed annealing was performed on the above steel.

Texture (Polar Density):

Polar density was measured by using an EBSD method. Specifically, pretreatment (acetone ultrasonic degreasing) was performed on a sample material, and then was set on a SEM/EBSD sample stand. Orientations were measured at an interval of 0.2 μm in an area of 120 μm in an RD direction and 100 μm in a TD direction. FE-SEM (SU-70 manufactured by Hitachi Ltd.) in which a Schottky type thermoelectron gun was mounted was used for the measuring, and the acceleration voltage was set to 25 kV. OIM system v5.31 manufactured by TSL solutions was used as software for performing analysis with the EBSD method.

Polar density of the <111> orientation was obtained from the reverse pole figure in RD, on the assumption that polar density in a random state is set to 1. The polar density of the <111> orientation here is the maximum value of polar density in a range within 5° from <111>.

XRD Intensity Ratio:

X-ray diffraction measurement for the diffusion alloy layer was performed by using CuKα as an X-ray source and by using the 2θ/θ method. The diffraction intensity ratio ($I_{FeNi3}/I_{Ni}$) was obtained from intensity $I_{Ni}$ of the diffraction peak of Ni and intensity $I_{FeNi3}$ of the diffraction peak of FeNi$_3$ which were obtained by the X-ray diffraction measurement. The diffraction peak intensity, in which a diffraction angle (2θ/θ) is observed in a vicinity of 51.8° in a case where CuKα was used as an X-ray source, is used as the intensity $I_{Ni}$ of the diffraction peak of Ni. The diffraction peak intensity, in which the diffraction angle (2θ/θ) is observed in a vicinity of 51°±0.1° in a case where CuKα was used as an X-ray source, is used as the intensity $I_{FeNi3}$ of the diffraction peak of FeNi$_3$.

Aspect Ratio:

The aspect ratio was obtained based on an EBSD orientation mapping image. A reverse pole orientation mapping image was used as the EBSD orientation mapping image, and Ni was used as lattice data.

An EBSD orientation mapping image which has a visual field of 100 μm was divided into four equal parts. 100 grains of which boundaries were clearly confirmed were randomly selected in an area of each of the parts obtained by division. The maximum length of each of the selected grains was measured horizontally and vertically. The short one of the measured lengths was set as a short axis, and the long one was set as a long axis. The short axis and the long axis were calculated, and thus were used as the aspect ratio of each of the grains. Since 100 pieces were selected in each of the areas obtained by division into four equal parts, aspect ratios of the total 400 pieces were obtained. The average value of the aspect ratios of 400 pieces was defined as the aspect ratio.

The aspect ratio was evaluated based on criteria in which a range of 1.0 to 2.85 was set as an A rank, a range of more than 2.85 and equal to or less than 5.0 was set as a B rank, and a range of more than 5.0 was set as failure (NG).

Workability:

A rolled steel foil was cut out by a sharp cutter, so as to have 1 cm in width, and 10 cm in length, and was collected as a sample piece. A tensile test was performed at a gauge length (between points to be evaluated) of 10 mm, at a chuck moving rate of 1 mm/minute, by using AUTOGRAPH AGS-H manufactured by Shimadzu Corporation and elongation until the foil was broken was measured. If the broken extension was equal to or more than 12%, an A rank was set. If the broken extension was equal to or more than 10% and less than 12%, a B rank was set. If the broken extension was 7% to less than 10%, a C rank was set. If the broken extension was equal to or more than 5% and less than 7%, a D rank was set. If the broken extension was less than 5%, failure (NG) was set.

Electrolyte Resistance:

A chromium-based surface treatment layer was formed on the steel foils in Examples 1 to 17 and Comparative Examples 1 to 9. Regarding the chromium-based surface treatment, phosphoric acid, hydrochloric acid, ammonium fluoride, and the like were appropriately added to a normal-temperature bath which contained 25 g/L of chromic anhydride, 3 g/L of sulfuric acid, and 4 g/L of nitric acid, and an electrolytic chromate treatment layer was formed at cathode current density of 25 A/dm$^2$, by using the bath. The thickness of the chromate treatment layer was set to 10 nm by adjusting a treatment time. The film thickness is not proportional to the treatment time, and controlling the film thickness by using the conducted amount, the estimated reacting amount, and the like is not possible. Thus, the thickness of the chromate treatment layer was directly measured by XPS analysis (Quantum2000 type manufacture by PHI Corporation, X-ray source is AlKα (1486.7 eV) monochrome, output of X-ray is 15 kV and 1.6 mA), and was controlled. In the examples and the comparative examples, a chromate treatment was performed only on a single surface.

Then, a polypropylene film having a thickness of 30 μm was laminated on the chromate treatment layer.

10 sample pieces obtained by cutting the steel foil which has a polypropylene film laminated thereon, so as to be 5 mm×40 mm were manufactured in each of the examples. The five sample pieces which were the half were completely immersed in an electrolyte in a polypropylene bottle which can be enclosed by using a lid. Then, the sample pieces were maintained at 80° C. for 7 days. A 180° peel test based on JIS K 6854-2 was performed on all of the five sample pieces which had not been immersed in the electrolyte and on the five sample pieces which had been immersed in the electrolyte and the adhesive strength of the polypropylene film was measured. A percentage was obtained by dividing adhesive strength of the immersed sample pieces by adhesive strength of the sample pieces which had not been immersed. The obtained percentage was set as a decrease ratio, and was used as an index of the electrolyte resistance. It is shown that the electrolyte resistance is increased as the decrease ratio decreases.

The decrease ratio of Comparative Example 5 (as Ni plating) in this test is 50%. A case of which the decrease ratio is smaller than 50% was determined to be better than Comparative Example 5, and was evaluated to be a pass (GOOD). A case of which the decrease ratio is equal to or more than 50% was determined to be equal to or worse than that in Comparative Example 5, and was evaluated to be failure (NG). As an electrolyte, a liquid obtained by diluting hexafluorophosphate (LiPF$_6$) with a solvent, which is obtained by mixing ethylene carbonate and diethyl carbonate at 1:1, so as to have concentration of 1 mol/L is used.

Table 4 shows results obtained by the above-described evaluations.

In Comparative Example 2, since the temperature in heat treatment after cold rolling is too high, a desired texture is not obtained. Thus, electrolyte resistance is largely degraded.

In Comparative Example 4, since the nickel-plated layer is not formed, the diffusion alloy layer is also not formed, and electrolyte resistance is largely degraded.

TABLE 4

|  |  | EBSD <111> pole density | Ni content of diffusion alloy layer g/m² | Diffraction strength ratio 5.0 or more | Aspect ratio | Workability | Electrolyte resistance |
|---|---|---|---|---|---|---|---|
| Examples | 1 | 3.8 | 1.35 | 5.0 or more | B | C | GOOD |
|  | 2 | 3.6 | 1.35 | 5.0 or more | B | B | GOOD |
|  | 3 | 3.6 | 1.35 | 5.0 or more | B | B | GOOD |
|  | 4 | 3.4 | 1.35 | 5.0 or more | A | A | GOOD |
|  | 5 | 3.8 | 1.35 | 5.0 or more | B | C | GOOD |
|  | 6 | 2.7 | 1.35 | 5.0 or more | A | A | GOOD |
|  | 7 | 3.6 | 1.35 | 5.0 or more | B | B | GOOD |
|  | 8 | 3.6 | 1.35 | 5.0 or more | B | B | GOOD |
|  | 9 | 3.3 | 5.0 | 5.0 or more | B | B | GOOD |
|  | 10 | 3.4 | 2.7 | 5.0 or more | B | B | GOOD |
|  | 11 | 3.2 | 2.7 | 5.0 or more | B | B | GOOD |
|  | 12 | 2.5 | 4.5 | 5.0 or more | A | A | GOOD |
|  | 13 | 3.0 | 3.6 | 5.0 or more | B | B | GOOD |
|  | 14 | 3.6 | 1.35 | 5.0 or more | B | B | GOOD |
|  | 15 | 3.6 | 0.45 | 5.0 or more | B | B | GOOD |
|  | 16 | 2.6 | 0.3 | 5.0 or more | A | A | GOOD |
|  | 17 | 3.6 | 2.7 | less than 5.0 | B | D | GOOD |
| Comparative Examples | 1 | 3.6 | 2.7 | less than 5.0 | NG | NG | GOOD |
|  | 2 | 1.5 | 2.7 | 5.0 or more | A | A | NG |
|  | 3 | 3.6 | 2.7 | less than 5.0 | NG | NG | GOOD |
|  | 4 | — | 0 | — | — | A | NG |
|  | 5 | 0.7 | 5.0 | less than 5.0 | A | A | NG |
|  | 6 | 1.6 | 2.0 | 5.0 or more | A | A | NG |
|  | 7 | — | 0.5 | — | — | NG | NG |
|  | 8 | 0.7 | 9.0 | less than 5.0 | A | NG | NG |
|  | 9 | 0.7 | 9.0 | less than 5.0 | A | A | NG |

As shown in Table 4, the examples in the present invention show good electrolyte resistance, and good workability. The comparative examples have results in which any or both of electrolyte resistance and workability are bad.

Regarding texture of the diffusion alloy layers in Examples 1 to 17 and Comparative Examples 1 and 3 shown in Table 4, the integration degree of the <111> and <001> orientations in RD is high, and polar density of the <111> orientation in RD is equal to or more than 2.0. Regarding ND, integration is observed from <101> over <112>. Regarding TD, integration of the <101> orientation is observed. However, polar density in ND and TD does not reach 2.0. Thus, in the examples and comparative examples, the diffusion alloy layer having texture in which the <111> orientation is parallel to the rolling direction is provided. In Examples 1 to 17, the aspect ratio is equal to or more than the B rank. Thus, it is considered that Examples 1 to 17 show good electrolyte resistance and show good workability. Since the aspect ratio is more than 5.0, it is considered that Comparative Examples 1 and 3 have degraded workability.

In Comparative Examples 5, 6, 8, and 9, the integration degree of the <111> and <001> orientations in RD is low, the polar density of the <111> orientation in RD is less than 2.0, and the <111> orientation is not parallel to the rolling direction. Thus, it is considered that the electrolyte resistance is low.

In addition, in Comparative Example 7, since annealing before cold rolling is not performed, a diffusion layer of Fe and Ni is not formed, and the nickel-plated layer is fractured during the cold rolling.

INDUSTRIAL APPLICABILITY

According to the present invention, it is possible to provide a steel foil for a power storage device container which is a rolled steel foil having high strength and excellent workability, and which has excellent adhesion between a substrate and a resin layer even in an electrolyte in a case of being used in a power storage device container of which a polyolefin resin layer is formed on a surface, at a low price. It is possible to provide a power storage device container including the steel foil for a power storage device container, and a power storage device including the power storage device container. Thus, industrial usability is high.

BRIEF DESCRIPTION OF THE REFERENCE SYMBOLS

1 NICKEL-PLATING PROCESS
2 ANNEALING PROCESS
3 COLD-ROLLING PROCESS
4 RECRYSTALLIZATION ANNEALING PROCESS
5 CHROMIUM-BASED SURFACE TREATMENT PROCESS

6 POLYOLEFIN-BASED RESIN LAYER FORMING PROCESS
11 SUBSTRATE
12 ROLLED STEEL FOIL
13 DIFFUSION ALLOY LAYER
14 CHROMIUM-BASED SURFACE TREATMENT LAYER
15 POLYOLEFIN-BASED RESIN LAYER
20 POWER STORAGE DEVICE
21 POWER STORAGE DEVICE CONTAINER
22 POSITIVE LEAD
23 NEGATIVE LEAD

What is claimed is:

1. A steel foil for a power storage device container comprising:
   a rolled steel foil which has a thickness of 200 μm or less;
   a diffusion alloy layer which is formed on a surface layer of the rolled steel foil and contains Ni and Fe; and
   a chromium-based surface treatment layer which is formed on the diffusion alloy layer,
   wherein <111> polar density in a reverse pole figure of the diffusion alloy layer in a rolling direction is 2.0 to 6.0, and
   wherein an aspect ratio of a crystal in a surface of the diffusion alloy layer is 1.0 to 5.0.

2. The steel foil for a power storage device container according to claim 1, wherein
   $I_{FeNi3}/I_{Ni}$ which is a ratio between a intensity $I_{Ni}$ of a diffraction peak of Ni and a intensity $I_{FeNi3}$ of a diffraction peak of $FeNi_3$ which are obtained by measuring X-ray diffraction on the diffusion alloy layer is equal to or higher than 5.0 or the diffraction peak of Ni is not detected.

3. The steel foil for a power storage device container according to claim 1, further comprising:
   a polyolefin-based resin layer which is formed on a surface of the chromium-based surface treatment layer.

4. A power storage device container which includes the steel foil for a power storage device container according to claim 3.

5. A power storage device comprising:
   the power storage device container according to claim 4.

6. A manufacturing method of a steel foil for a power storage device container, the method comprising:
   a nickel-plating process of performing a nickel plating on a steel sheet so as to form a Ni-plated layer on the steel sheet, and obtaining a Ni-plated steel sheet;
   an annealing process of annealing the Ni-plated steel sheet so that Fe in the steel sheet and Ni in the Ni-plated layer are mutually diffused;
   a cold-rolling process of performing a cold rolling on the Ni-plated steel sheet at cumulative rolling reduction of 70% or higher, and obtaining a steel foil;
   a recrystallization annealing process of annealing the steel foil at 750° C. to 1100° C. for 4 to 120 seconds under an annealing condition in which Tc and Ta satisfy the following expression (1) in a case of 750≤Ta≤800 and satisfy the following expression (2) in a case of Ta>800, wherein an annealing time is defined as Tc in an unit second, and an annealing temperature is defined as Ta in an unit of ° C.; and
   a chromium-based surface treatment process of performing a chromium-based surface treatment on the steel foil;

$$Tc \geq 13 - 0.1 \times (Ta - 750) \quad (1)$$

$$Tc \geq 8 - (4/300) \times (Ta - 800) \quad (2).$$

7. The manufacturing method of a steel foil for a power storage device container, according to claim 6, wherein
   in the recrystallization annealing process, the Tc and the Ta satisfy the following expression (3) in a case of 750≤Ta≤800, and satisfy the following expression (4) in a case of Ta>800, $$Tc \geq 16 - 0.1 \times (Ta - 750) \quad (3)$$

$$Tc \geq 11 - 0.02 \times (Ta - 800) \quad (4).$$

8. The manufacturing method of a steel foil for a power storage device container, according to claim 6, further comprising:
   a polyolefin resin layer forming process of forming a polyolefin resin layer on a surface of the steel foil after the chromium-based surface treatment process by a thermal laminate method.

9. The steel foil for a power storage device container according to claim 2, further comprising:
   a polyolefin-based resin layer which is formed on a surface of the chromium-based surface treatment layer.

10. A power storage device container which includes the steel foil for a power storage device container according to claim 9.

11. A power storage device comprising:
    the power storage device container according to claim 10.

12. The manufacturing method of a steel foil for a power storage device container, according to claim 7, further comprising:
    a polyolefin resin layer forming process of forming a polyolefin resin layer on a surface of the steel foil after the chromium-based surface treatment process by a thermal laminate method.

* * * * *